US010668854B2

(12) United States Patent
Imaizumi et al.

(10) Patent No.: US 10,668,854 B2
(45) Date of Patent: Jun. 2, 2020

(54) WORK VEHICLE AND DISPLAY DEVICE

(71) Applicant: Komatsu Ltd., Tokyo (JP)

(72) Inventors: Masaaki Imaizumi, Tokyo (JP); Takeshi Kurihara, Tokyo (JP); Masataka Ozaki, Tokyo (JP)

(73) Assignee: KOMATSU LTD., Tokyo (JP)

(*) Notice: Subject to any disclaimer, the term of this patent is extended or adjusted under 35 U.S.C. 154(b) by 168 days.

(21) Appl. No.: 15/535,169

(22) PCT Filed: Feb. 9, 2017

(86) PCT No.: PCT/JP2017/004816
§ 371 (c)(1),
(2) Date: Jun. 12, 2017

(87) PCT Pub. No.: WO2018/146782
PCT Pub. Date: Aug. 16, 2018

(65) Prior Publication Data
US 2018/0370432 A1 Dec. 27, 2018

(51) Int. Cl.
*B60R 1/00* (2006.01)
*E02F 9/26* (2006.01)
(Continued)

(52) U.S. Cl.
CPC ............... *B60R 1/00* (2013.01); *B60R 11/00* (2013.01); *B60R 11/04* (2013.01); *E02F 3/34* (2013.01);
(Continued)

(58) Field of Classification Search
CPC ........... B60R 1/00; B60R 11/00; B60R 11/04; B60R 2011/004; B60R 2300/50;
(Continued)

(56) References Cited

U.S. PATENT DOCUMENTS

2010/0289899 A1* 11/2010 Hendron .............. B60R 1/00
348/148
2011/0311342 A1* 12/2011 Montgomery ......... G01C 21/04
414/685
(Continued)

FOREIGN PATENT DOCUMENTS

JP 58-026130 A 2/1983
JP 2008-303574 A 12/2008
(Continued)

OTHER PUBLICATIONS

Extended European Search Report dated Oct. 16, 2018 in the corresponding European patent application No. 17724310.2.
(Continued)

*Primary Examiner* — Marnie A Matt
(74) *Attorney, Agent, or Firm* — Locke Lord LLP

(57) ABSTRACT

A work vehicle includes a vehicle body, a working implement, a camera, and a display control unit. To the vehicle body, front tires are mounted. The working implement is movably coupled to the vehicle body and at least a part thereof is arranged anterior to the front tires. The camera is arranged at a front portion of the vehicle body and shoots an image of an anterior area outside the vehicle body as a shooting area. The display control unit causes a display device to display a shot image shot by the camera and a first guide image which indicates a first projection position obtained by projecting a first site of the working implement on a plane including ground-contacting surfaces of the front tires in a superimposed manner.

11 Claims, 17 Drawing Sheets

(51) Int. Cl.
  *B60R 11/00* (2006.01)
  *B60R 11/04* (2006.01)
  *E02F 3/34* (2006.01)
  *H04N 5/445* (2011.01)
  *H04N 5/247* (2006.01)
  *H04N 5/268* (2006.01)

(52) U.S. Cl.
  CPC .............. *E02F 9/261* (2013.01); *E02F 9/264* (2013.01); *H04N 5/44504* (2013.01); *B60R 2011/004* (2013.01); *B60R 2300/50* (2013.01); *H04N 5/247* (2013.01); *H04N 5/268* (2013.01)

(58) Field of Classification Search
  CPC .. E02F 3/34; E02F 9/261; E02F 9/264; H04N 5/44504; H04N 5/247; H04N 5/268
  USPC .......................................................... 348/118
  See application file for complete search history.

(56) References Cited

U.S. PATENT DOCUMENTS

| | | | | |
|---|---|---|---|---|
| 2012/0287277 | A1* | 11/2012 | Koehrsen | B60R 1/00 348/148 |
| 2013/0155240 | A1* | 6/2013 | Mitsuta | B60R 1/00 348/148 |
| 2013/0222573 | A1* | 8/2013 | Onuma | E02F 9/24 348/82 |
| 2014/0088824 | A1* | 3/2014 | Ishimoto | E02F 9/0841 701/34.4 |
| 2014/0188333 | A1* | 7/2014 | Friend | E02F 9/261 701/34.4 |
| 2014/0293051 | A1* | 10/2014 | Nakamura | E02F 9/261 348/148 |
| 2015/0138356 | A1* | 5/2015 | Kowatari | B60R 1/00 348/144 |
| 2015/0175071 | A1* | 6/2015 | Ishimoto | E02F 9/262 348/148 |
| 2015/0199004 | A1* | 7/2015 | Johnson | G06F 3/013 345/156 |
| 2015/0354178 | A1* | 12/2015 | Jeong | E02F 9/267 340/438 |
| 2016/0224026 | A1 | 8/2016 | Hamada et al. | |
| 2016/0353049 | A1 | 12/2016 | Maley | |
| 2017/0050566 | A1* | 2/2017 | Yamashita | B60R 1/002 |
| 2018/0051446 | A1* | 2/2018 | Yoshinada | E02F 9/264 |

FOREIGN PATENT DOCUMENTS

| | | |
|---|---|---|
| JP | 5779244 B2 | 9/2015 |
| JP | 2016-106192 A | 6/2016 |
| JP | 5941663 B2 | 6/2016 |
| JP | 2016-160741 A | 9/2016 |
| WO | 2016/031009 A1 | 3/2016 |

OTHER PUBLICATIONS

International Search Report and Written Opinion dated Apr. 25, 2017, issued for PCT/JP2017/004816.

* cited by examiner

WORK VEHICLE AND DISPLAY DEVICE

FIELD

The present invention relates to a work vehicle and a display device.

BACKGROUND

In a technological field pertaining to work vehicles, technology has been known with which surrounding conditions of a work vehicle are monitored with a camera, such as that disclosed in Patent Literature 1.

CITATION LIST

Patent Literature

Patent Literature 1: Japanese Laid-open Patent Publication No. JP 2008-303574

SUMMARY

Technical Problem

In a case of performing a loading operation for loading excavated material into a transport vehicle by using a working implement of a work vehicle, an operator of the work vehicle may find it difficult to accurately recognize relative positions of the work vehicle and the transport vehicle. When the operator is not able to accurately recognize the relative positions of the work vehicle and the transport vehicle and consequently the work vehicle and the transport vehicle are too close to or too far away from each other, it becomes difficult to smoothly perform the loading operation.

An object of an aspect of the present invention is to let an operator of a work vehicle accurately recognize relative positions of the work vehicle and a transport vehicle.

Solution to Problem

According to a first aspect of the present invention, a work vehicle comprises: a vehicle body to which front tires are mounted; a working implement movably coupled to the vehicle body and at least a part of which is arranged anterior to the front tires; a camera that is arranged at a front portion of the vehicle body and shoots an image of an anterior area outside the vehicle body as a shooting area; and a display control unit that causes a display device to display a shot image shot by the camera and a first guide image that indicates a first projection position obtained by projecting a first site of the working implement on a plane including ground-contacting surfaces of the front tires in a superimposed manner.

According to a second aspect of the present invention, a work vehicle comprises: a vehicle body to which front tires are mounted; a working implement that includes a boom coupled to the vehicle body and a bucket coupled to the boom; a camera that is arranged at a front portion of the vehicle body and shoots an image of a shooting area including at least a part of the front tires; and a display control unit that causes a display device to display a shot image shot by the camera, a first guide image that indicates a first projection position obtained by projecting a distal end of the bucket on a plane including ground-contacting surfaces of the tires, and a second guide image that indicates a second projection position obtained by projecting front ends of the front tires on the plane in a superimposed manner.

According to a second aspect of the present invention, a display device is provided separately from a work vehicle comprising: a vehicle body to which front tires are mounted; a working implement movably coupled to the vehicle body and at least a part of which is arranged anterior to the front tires; a camera that is arranged at a front portion of the vehicle body and shoots an image of an anterior area outside the vehicle body as a shooting area; and a wireless communication system, and is caused to display a shot image shot by the camera and transmitted from the work vehicle via the wireless communication system and a first guide image that indicates a first projection position obtained by projecting a first site of the working implement on a plane including ground-contacting surfaces of the front tires in a superimposed manner.

Advantageous Effects of Invention

According to an aspect of the present invention, it is possible to let an operator accurately recognize relative positions of a work vehicle and a transport vehicle.

DESCRIPTION OF EMBODIMENTS

Hereinbelow, embodiments according to the present invention will be described with reference to the drawings. However, the present invention is not limited thereto. Components of the embodiments described below may be combined appropriately. There may be a case where some components are not used.

First Embodiment

[Outline of Wheel Loader]

Figure 1:
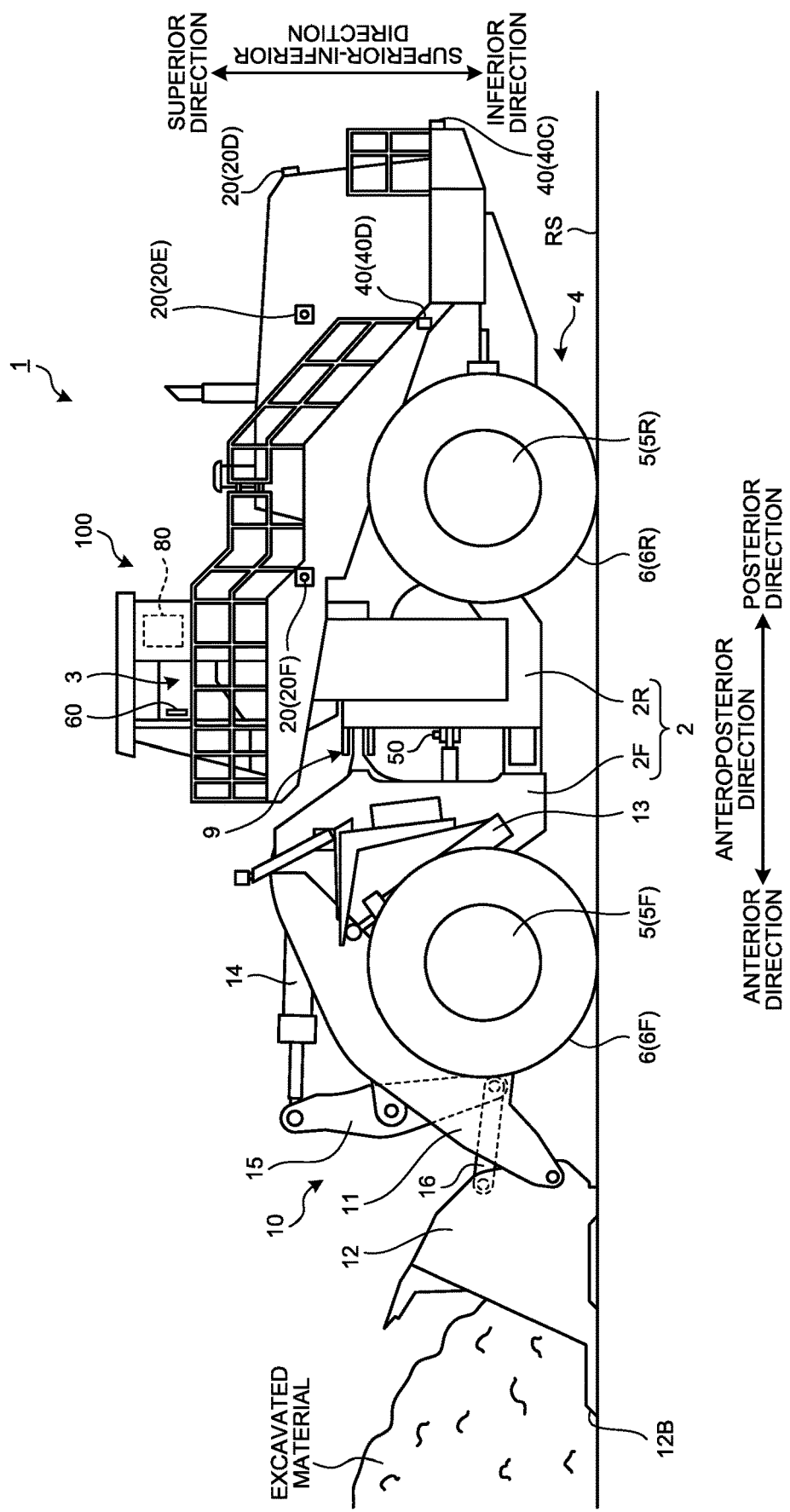
FIG. 1 is a side view illustrating an example of a work vehicle according to a first embodiment.
Figure 2:
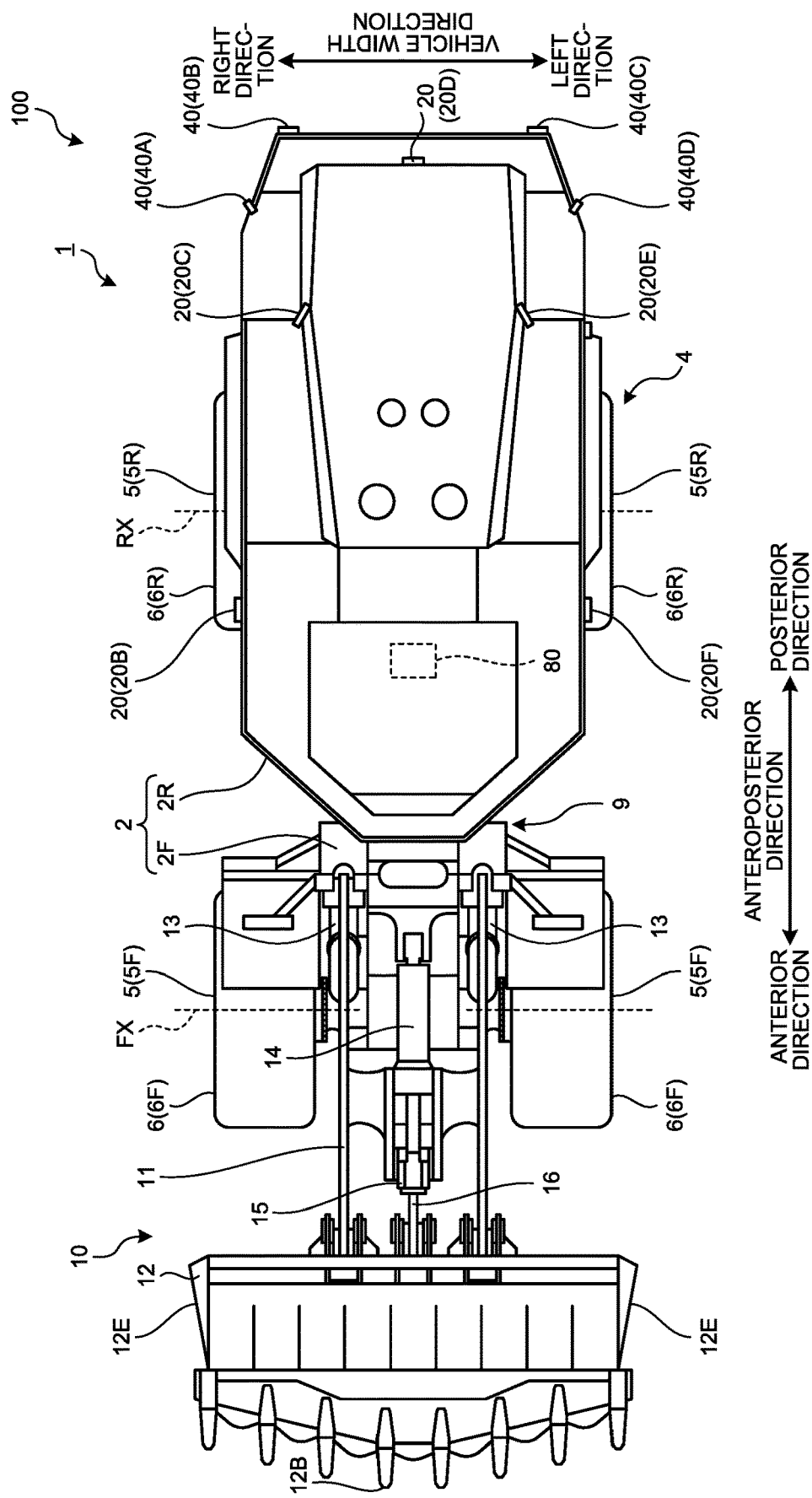
FIG. 2 is a top view illustrating the example of the work vehicle according to the first embodiment.
Figure 3:
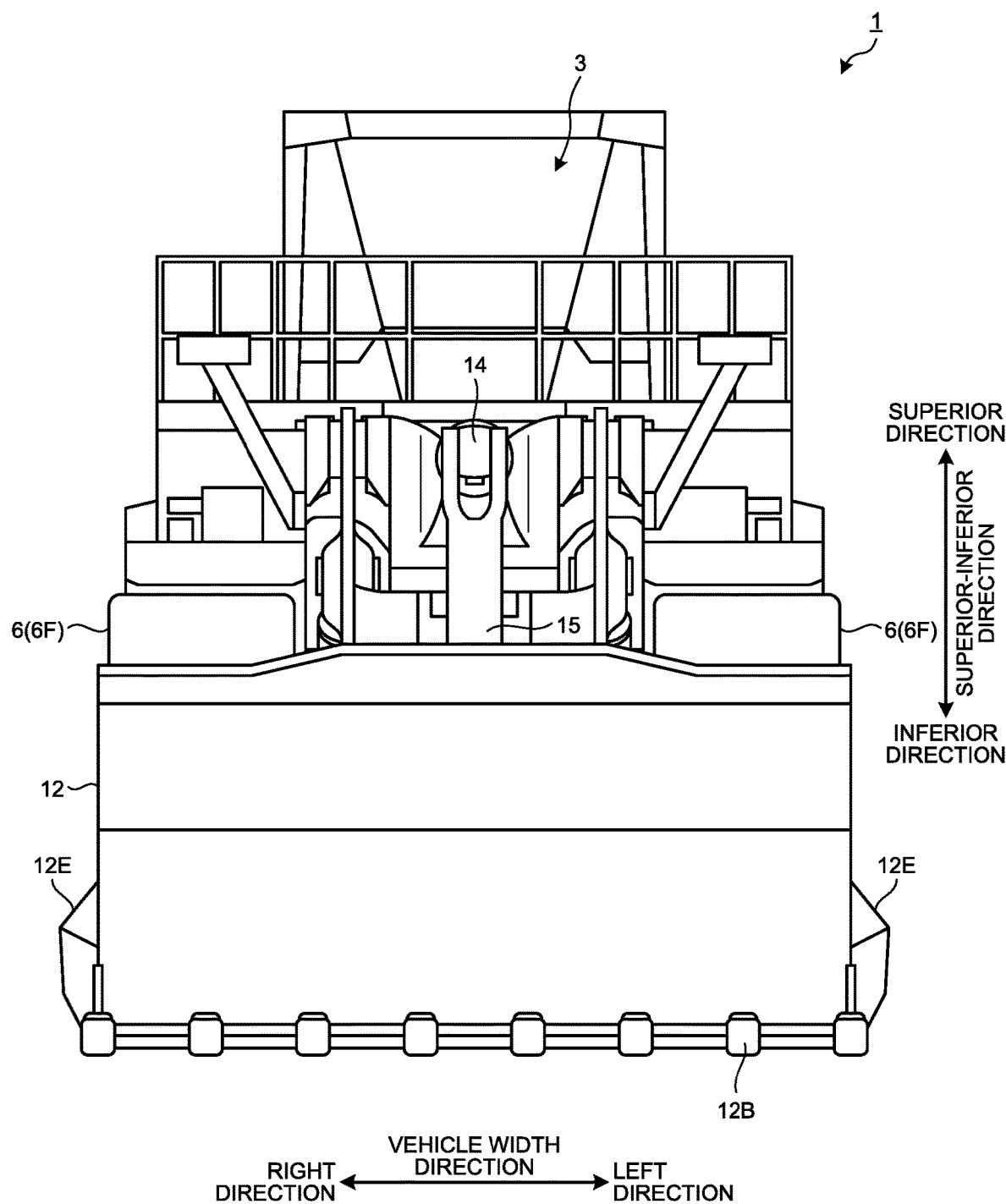
FIG. 3 is a front elevational view illustrating the example of the work vehicle according to the first embodiment.

A first embodiment will be described. FIG. 1 is a side view illustrating an example of a work vehicle 1 according to the present embodiment. FIG. 2 is a top view illustrating the example of the work vehicle 1 according to the present embodiment. FIG. 3 is a front elevational view illustrating the example of the work vehicle 1 according to the present embodiment. In the present embodiment, it is assumed that the work vehicle 1 is a wheel loader 1, which is a kind of articulated work vehicle. Furthermore, in the present embodiment, it is assumed that the wheel loader 1 operates in a mining site. The wheel loader 1 loads excavated material scooped with a bucket 12 into a vessel of a transport vehicle. For example, a dump truck is used as the transport vehicle. There may be a case where the wheel loader 1 discharges excavated material scooped with the bucket 12 to a discharge location provided at a predetermined place in a mine.

As illustrated in FIGS. 1, 2, and 3, the wheel loader 1 includes a vehicle body 2, an operation platform 3 on which an operator's seat is provided, a traveling device 4, and a working implement 10 supported by the vehicle body 2.

The vehicle body 2 includes a vehicle body front portion 2F and a vehicle body rear portion 2R. The vehicle body front portion 2F and the vehicle body rear portion 2R are bendably coupled via a joint mechanism 9. An angle sensor 50, which detects a bending angle θ between the vehicle body front portion 2F and the vehicle body rear portion 2R, is provided in the joint mechanism 9.

The operation platform 3 is supported by the vehicle body 2. The wheel loader 1 is operated by an operator who mounts the operation platform 3. A driving operation device operated by the operator is arranged on the operation platform 3. The driving operation device includes, for example, an accelerator pedal, a brake pedal, a shift lever, a steering lever for swinging and steering the wheel loader 1, a forward/backward switch for performing switching between forward traveling and backward traveling of the wheel loader 1, and an operation lever for operating the working implement 10. The operator operates the driving operation device to perform adjustment of a traveling speed, switching between forward traveling and backward traveling, and swing of the wheel loader 1, and operation of the working implement 10.

The traveling device 4 supports the vehicle body 2. The traveling device 4 has wheels 5. The wheels 5 are rotated by power generated by an engine mounted on the vehicle body 2. Tires 6 are mounted to the wheels 5. The wheels 5 include two front wheels 5F supported by the vehicle body front portion 2F and two rear wheels 5R supported by the vehicle body rear portion 2R. The tires 6 include front tires 6F mounted to the front wheels 5F and rear tires 6R mounted to the rear wheels 5R. The traveling device 4 can travel on ground surface RS.

The front wheels 5F and the front tires 6F are rotatable about a rotation axis FX. The rear wheels 5R and the rear tires 6R are rotatable about a rotation axis RX.

In the following description, a direction in parallel with the rotation axis FX of the front tires 6F is appropriately referred to as a vehicle width direction, a direction perpendicular to ground-contacting surfaces of the front tires 6F which contact the ground surface RS is appropriately referred to as a superior-inferior direction, and a direction perpendicular to both of the vehicle width direction and the superior-inferior direction is appropriately referred to as an anteroposterior direction. When the vehicle body 2 of the wheel loader 1 travels in a straight line, the rotation axis FX and the rotation axis RX are in parallel with each other.

In the following description, a position or a direction close to the center of the vehicle body 2 in the vehicle width direction is appropriately referred to as an inside or an inward direction in the vehicle width direction, and a position or a direction away from the center of the vehicle body 2 is appropriately referred to as an outside or an outward direction in the vehicle width direction. In the vehicle width direction, one direction based on the operator's seat on the operation platform 3 is appropriately referred to as a right side or a right direction, and an opposite side or an opposite direction of the right side or the right direction is appropriately referred to as a left side or a left direction. In the anteroposterior direction, a position or a direction close to the working implement 10 based on the operator's seat on the operation platform 3 is appropriately referred to as a front side or an anterior direction, and an opposite side or an opposite direction of the front side or the anterior direction is appropriately referred to as a rear side or a posterior direction. In the superior-inferior direction, a position or a direction close to the ground-contacting surfaces of the front tires 6F is appropriately referred to as a lower side or an inferior direction, and an opposite side or an opposite direction of the lower side or the inferior direction is appropriately referred to as an upper side or a superior direction.

The vehicle body front portion 2F is arranged anterior to the vehicle body rear portion 2R. The front wheels 5F and the front tires 6F are arranged anterior to the rear wheels 5R and the rear tires 6R. The front wheels 5F and the front tires 6F are arranged on both sides of the vehicle body 2 in the vehicle width direction. The rear wheels 5R and the rear tires 6R are arranged on both sides of the vehicle body 2 in the vehicle width direction. The vehicle body front portion 2F bends leftward and rightward with respect to the vehicle body rear portion 2R.

The working implement 10 is movably coupled to the vehicle body 2. At least a part of the working implement 10 is arranged anterior to the front tires 6F. In the present embodiment, the working implement 10 includes a boom 11 movably coupled to the vehicle body 2, a bucket 12 movably coupled to the boom 11, a bell crank 15, and a link 16.

The boom 11 is actuated by power generated by a boom cylinder 13. The boom cylinder 13 is a hydraulic cylinder which generates power to move the boom 11. One end of the boom cylinder 13 is coupled to the vehicle body 2. Another end of the boom cylinder 13 is coupled to the boom 11. Two boom cylinders 13 are provided. One boom cylinder 13 is provided on a right of the center of the vehicle body 2 in the vehicle width direction. Another boom cylinder 13 is provided on a left of the center of the vehicle body 2 in the vehicle width direction. When the operator operates an operation lever, the boom cylinder 13 extends and retracts. By the boom cylinder 13 thus extending and retracting, a raising operation and a lowering operation of the boom 11 are performed.

The raising operation of the boom 11 is an operation for raising a distal end of the boom 11 to get farther away from the ground surface RS. The lowering operation of the boom 11 is an operation for lowering the distal end of the boom 11 to get closer to the ground surface RS. The raising operation and the lowering operation of the boom 11 are performed within a range of movement of the boom 11. Regarding the boom 11 in the raising operation, movement in a superior direction is restricted beyond an upper end of the range of movement of the boom 11. Regarding the boom 11 in the lowering operation, movement in an inferior direction is restricted beyond a lower end of the range of movement of the boom 11.

The bucket 12 is a working member which has a distal end 12B including a blade edge. The bucket 12 is arranged anterior to the front tires 6F. The bucket 12 is coupled to the distal end of the boom 11. The bucket 12 is actuated by power generated by a bucket cylinder 14. The bucket cylinder 14 is a hydraulic cylinder which generates power to move the bucket 12. A central portion of the bell crank 15 is rotatably coupled to the boom 11. One end of the bucket cylinder 14 is coupled to the vehicle body 2. Another end of the bucket cylinder 14 is coupled to one end of the bell crank 15. Another end of the bell crank 15 is coupled to the bucket 12 via the link 16. One bucket cylinder 14 is provided. The bucket cylinder 14 is provided at a central portion in the vehicle width direction. When the operator operates an operation lever, the bucket cylinder 14 extends and retracts. By the bucket cylinder 14 thus extending and retracting, a dump operation and a tilt operation of the bucket 12 are performed.

The dump operation of the bucket 12 is an operation for rotating the bucket 12 such that an opening of the bucket 12 faces downward and the distal end 12B of the bucket 12 gets closer to the ground surface RS. The tilt operation of the bucket 12 is an operation for rotating the bucket 12 such that the opening of the bucket 12 faces upward and the distal end 12B of the bucket 12 gets farther away from the ground surface RS. The bucket 12 performs the dump operation and the tilt operation within a range of movement of the bucket 12. Regarding the bucket 12 in the dump operation, movement in an inferior direction is restricted beyond a lower end of the range of movement of the bucket 12. Regarding the bucket 12 in the tilt operation, movement in a superior direction is restricted beyond an upper end of the range of movement of the bucket 12.

By performing the dump operation of the bucket 12, excavated material scooped by the bucket 12 is discharged from the bucket 12. By performing the tilt operation of the bucket 12, the bucket 12 scoops excavated material.

As illustrated in FIGS. 2 and 3, ends 12E on both sides of the bucket 12 in the vehicle width direction are arranged outside the tires 6 in the vehicle width direction. In other words, distance between the end 12E on a right side of the bucket 12 and the end 12E on a left side thereof in the vehicle width direction is greater than distance between an outer side surface of the tire 6 on a right side and an outer side surface of the tire 6 on a left side in the vehicle width direction.

Figure 4:
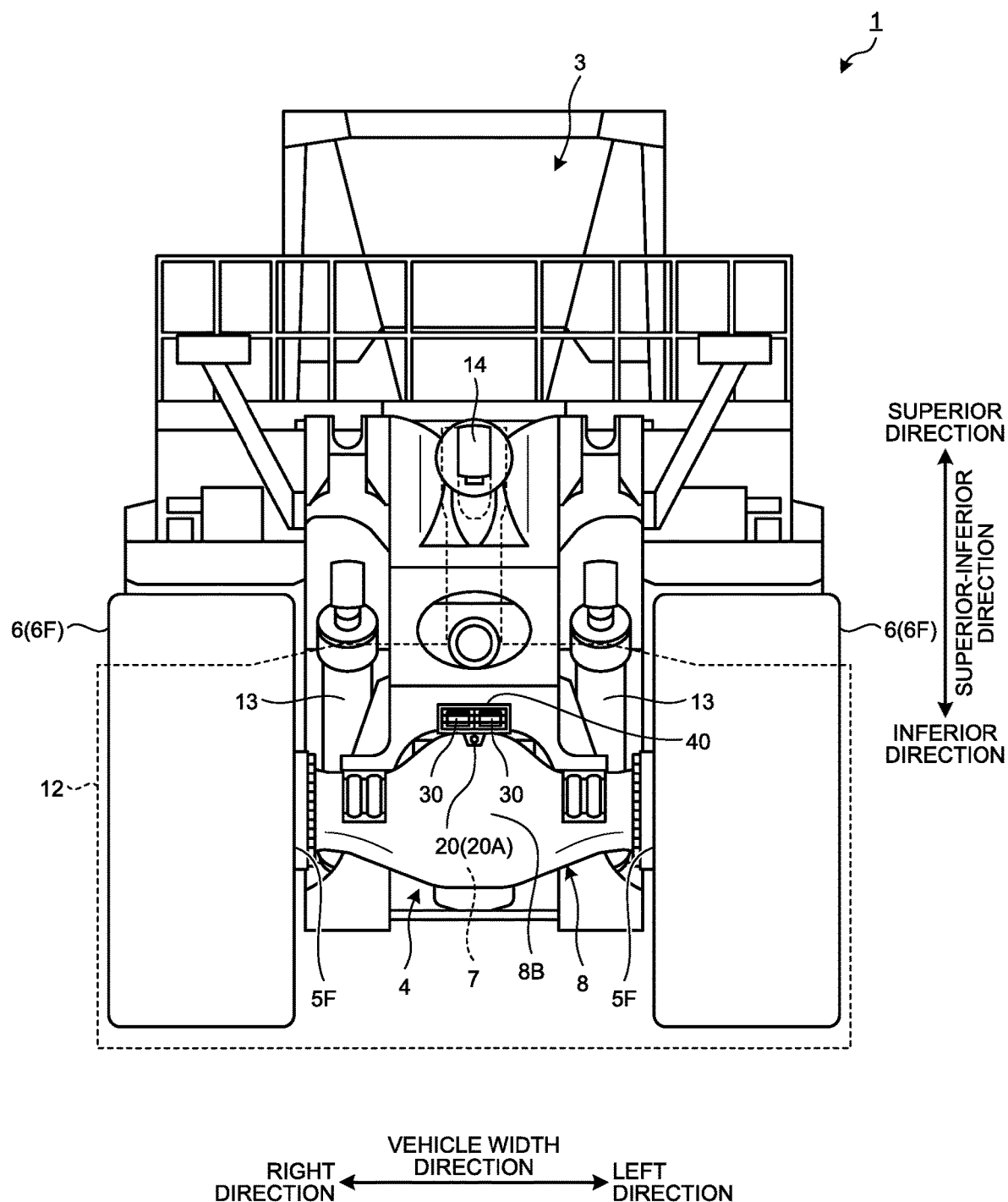
FIG. 4 is a front elevational view illustrating a part of the work vehicle according to the first embodiment.

FIG. 4 is a front elevational view illustrating a part of the wheel loader 1 according to the present embodiment, and corresponds to a view in which the bucket 12 and the bell crank 15 are omitted (illustrated by a dashed line). In the present embodiment, the traveling device 4 includes a power transmission mechanism 7 and a housing 8. The power transmission mechanism 7 transmits power generated in the engine to the front wheels 5F. The housing 8 accommodates at least a part of the power transmission mechanism 7. The engine is arranged in the vehicle body rear portion 2R. The power generated in the engine is transmitted to the left and right front wheels 5F via a differential gear of the power transmission mechanism 7. The differential gear is accommodated in an axle ball 8B, which is a spherical portion of the housing 8. The axle ball 8B is arranged at a central portion in the vehicle width direction. The axle ball 8B is arranged inferior to the bucket cylinder 14.

[Outline of Surroundings Monitoring System]

In the present embodiment, the wheel loader 1 includes a surroundings monitoring system 100 which monitors surroundings of the wheel loader 1 and lets the operator of the wheel loader 1 recognize surrounding conditions of the wheel loader 1. The surroundings monitoring system 100 includes a plurality of cameras 20, a plurality of non-contact sensors 40, a display device 60, and a control device 80. The cameras 20 shoot images of the surroundings of the wheel loader 1. The non-contact sensors 40 detect an obstacle in the surroundings of the wheel loader 1 in a non-contact manner.

[Cameras]

The cameras 20 are mounted on the wheel loader 1 and shoot shot images of the surroundings of the wheel loader 1. In the present embodiment, six cameras 20 are mounted on the wheel loader 1. By the plurality of cameras 20 mounted on the wheel loader 1, the surroundings monitoring system 100 can acquire shot images of different areas in the surroundings of the wheel loader 1.

As illustrated in FIGS. 1, 2, 3, and 4, the cameras 20 are provided on outer surfaces of the vehicle body 2 of the wheel loader 1 in order to acquire shot images of the surroundings of the wheel loader 1. In the present embodiment, the cameras 20 include cameras 20A, 20B, 20C, 20D, 20E, and 20F. The camera 20A shoots an image of an anterior area outside the vehicle body 2 as the shooting area. The camera 20B shoots an image of a right area outside the vehicle body 2. The camera 20C shoots an image of a right area and a right-posterior area outside the vehicle body 2. The camera 20D shoots an image of a posterior area outside the vehicle body 2. The camera 20E shoots an image of a left area and a left-posterior area outside the vehicle body 2. The camera 20F shoots an image of a left area outside the vehicle body 2.

In the present embodiment, the camera 20A is provided in the vehicle body front portion 2F. The cameras 20B, 20C, 20D, 20E, and 20F are provided in the vehicle body rear portion 2R.

Figure 5:
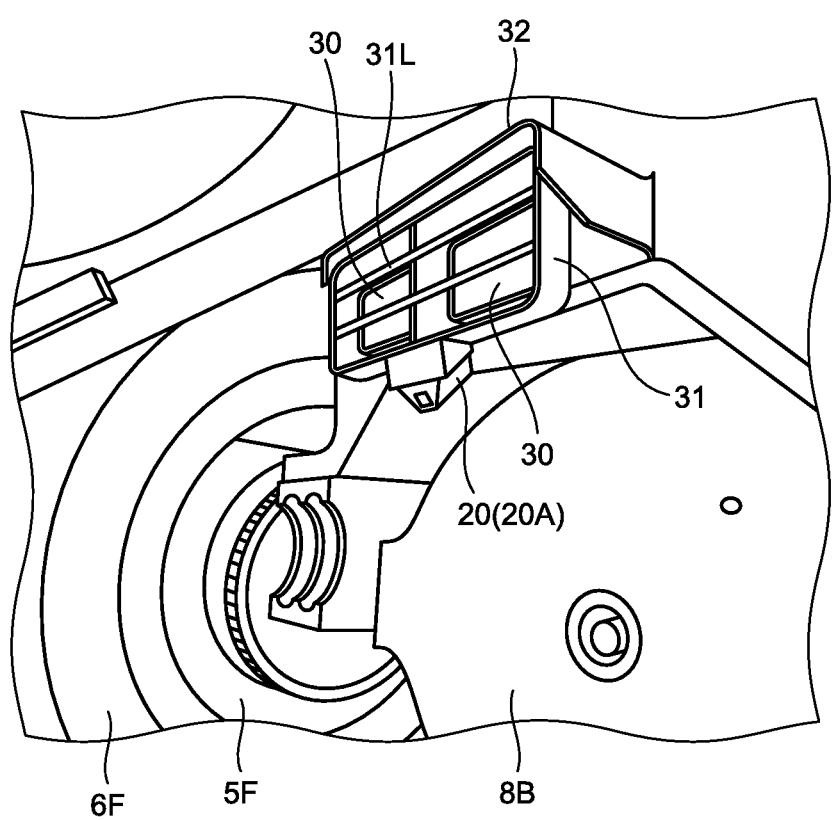
FIG. 5 is a perspective view illustrating an example of a camera according to the first embodiment.

FIG. 5 is a perspective view illustrating an example of the camera 20A according to the present embodiment. As illustrated in FIGS. 4 and 5, the camera 20A is arranged at a front portion of the vehicle body front portion 2F. The camera 20A is arranged inferior to the bucket cylinder 14, and is arranged superior to the axle ball 8B of the housing 8. One camera 20A is arranged at a central portion in the vehicle width direction. The camera 20A is arranged slightly anterior to the axle ball 8B.

The wheel loader 1 includes illumination devices 30 which are supported by the vehicle body 2 and illuminate the shooting area of the camera 20A. Each of the illumination devices 30 includes a front lamp which emits illumination light. In the present embodiment, two illumination devices 30 are provided superior to the camera 20A. The illumination devices 30 are accommodated in a casing 31. The casing 31 includes rod members 31L which protect the illumination devices 30 without preventing irradiation of the illumination light. The rod members 31L are arranged anterior to the illumination devices 30.

A cover member 32 is provided in the vehicle body front portion 2F of the wheel loader 1. The cover member 32 is arranged between the bucket cylinder 14 and the camera 20A in the superior-inferior direction, and protects the camera 20A. In the present embodiment, the cover member 32 is an eave member arranged superior to the camera 20A and the illumination devices 30.

Figure 6:
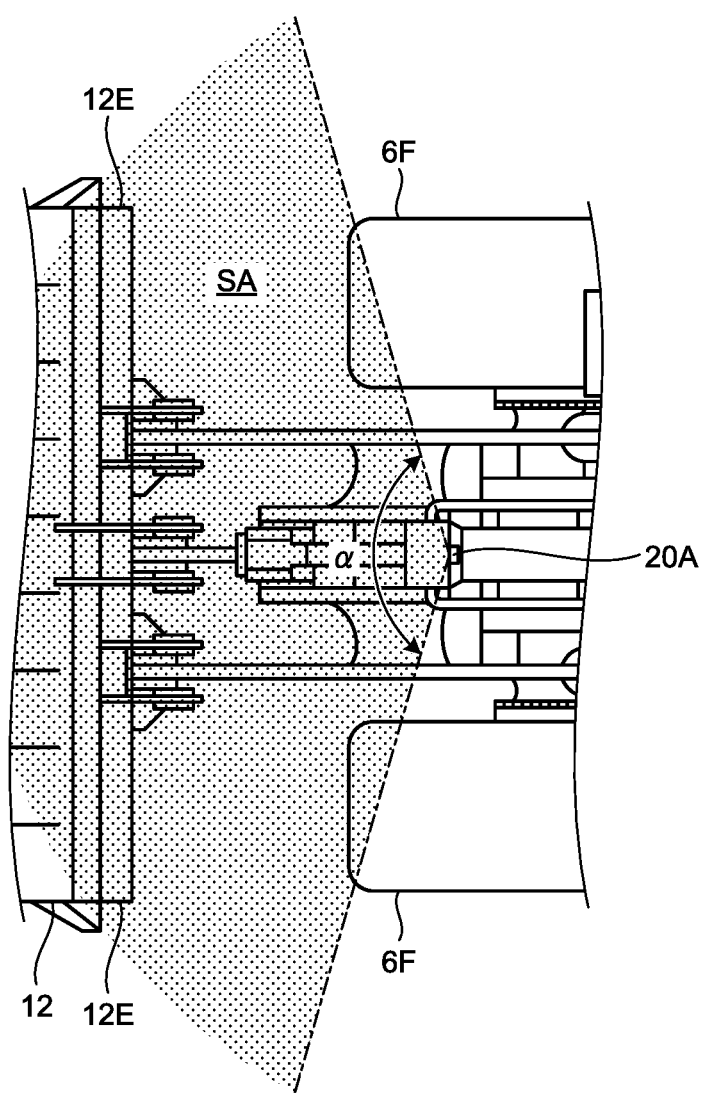
FIG. 6 is a schematic view for explaining a shooting area of the camera according to the first embodiment.
Figure 7:
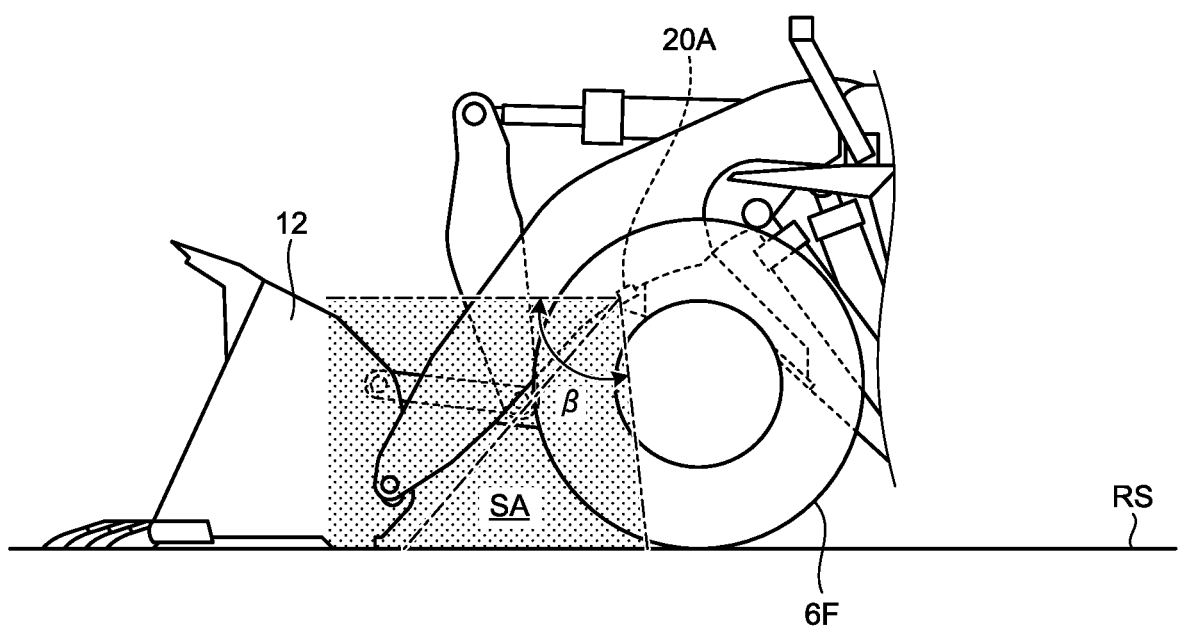
FIG. 7 is a schematic view for explaining the shooting area of the camera according to the first embodiment.
Figure 8:
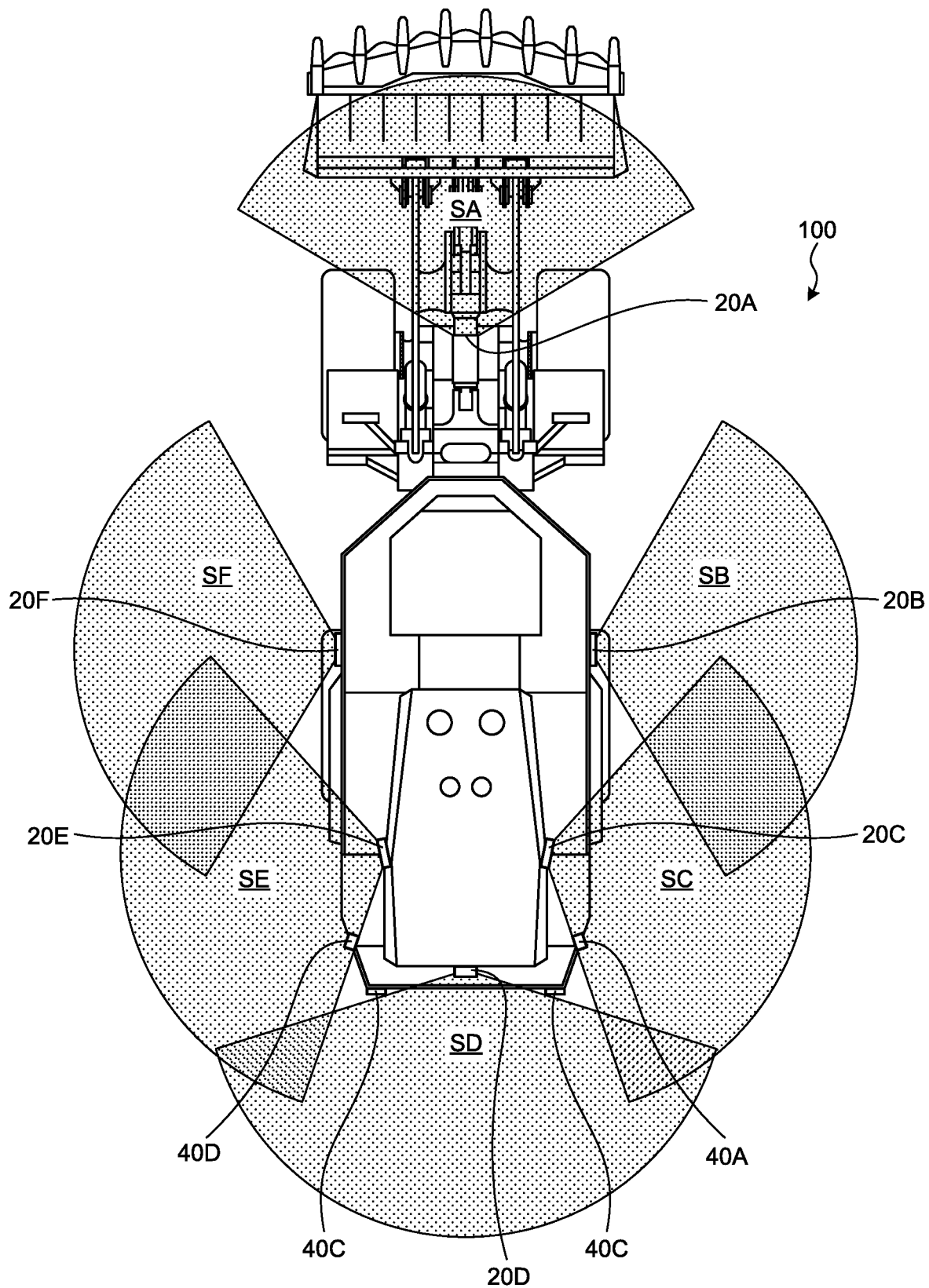
FIG. 8 is a schematic view for explaining shooting areas of cameras according to the first embodiment.

FIGS. 6 and 7 are schematic views for explaining a shooting area SA of the camera 20A according to the present embodiment. FIG. 6 illustrates the shooting area SA from a superior view. FIG. 7 illustrates the shooting area SA from a lateral view. FIG. 8 is a schematic view for explaining respective shooting areas SA, SB, SC, SD, SE, and SF of the cameras 20A, 20B, 20C, 20D, 20E, and 20F according to the present embodiment, from a superior view. The shooting areas of the cameras 20 include areas of fields of view of optical systems of the cameras 20. Each of the cameras 20 shoots an image of an obstacle present in the corresponding shooting area, for example.

The camera 20A shoots an image of the shooting area SA defined to be an anterior area outside the vehicle body 2. The shooting area SA of the camera 20A is defined to spread in an anterior direction of the vehicle body 2. As illustrated in FIG. 6, an angle of view α of the camera 20A in the vehicle width direction is about 120[°]. As illustrated in FIG. 7, an angle of view β of the camera 20A in the superior-inferior direction is from 90[°] to 100[°].

As illustrated in FIGS. 6 and 7, the shooting area SA of the camera 20A includes at least a part of the front tires 6F. A lens or an installation position of the camera 20A may be adjusted and set such that the front tires 6F are not included in the shooting area SA of the camera 20A. In the present embodiment, the shooting area SA of the camera 20A includes front portions of the front tires 6F. In addition, the shooting area SA of the camera 20A includes the ground surface RS between the front tires 6F and the bucket 12 which is arranged anterior to the front tires 6F and is being in contact with the ground surface RS. Furthermore, the shooting area SA of the camera 20A includes the ends 12E on both sides of the bucket 12.

In other words, in the present embodiment, the camera 20A shoots an image of the ground surface RS between the bucket 12 and the front tires 6F such that the ends 12E on both sides of the bucket 12 and the front portions of the front tires 6F are included in a shot image in a state where a lowering operation of the boom 11 has been performed so as to bring the bucket 12 into contact with the ground surface RS.

The camera 20B shoots an image of the shooting area SB defined to be a right area outside the vehicle body 2. The shooting area SB of the camera 20B is defined to spread in a right direction of the vehicle body 2. As illustrated in FIGS. 2, 8, and the like, the camera 20B is provided at a right-side portion of the vehicle body rear portion 2R. In the present embodiment, the camera 20B is provided in the vicinity of a platform which is a middle portion of steps leading to the operator's cabin on the operation platform 3.

The camera 20C shoots an image of the shooting area SC defined to be a right area and a right-posterior area outside the vehicle body 2. The shooting area SC of the camera 20C is defined to spread in a right direction and a right-posterior direction of the vehicle body 2. As illustrated in FIGS. 2, 8, and the like, the camera 20C is provided at a right portion of a radiator guard provided at a rear portion of the vehicle body rear portion 2R.

The camera 20D shoots an image of the shooting area SD defined to be a posterior area outside the vehicle body 2. The shooting area SD of the camera 20D is defined to spread in a posterior direction of the vehicle body 2. As illustrated in FIGS. 2, 8, and the like, the camera 20D is provided at a central portion of the radiator guard provided at the rear portion of the vehicle body rear portion 2R.

The camera 20E shoots an image of a left area and a left-posterior area outside the vehicle body 2. The shooting area SE of the camera 20E is defined to spread in a left direction and a left-posterior direction of the vehicle body 2. As illustrated in FIGS. 1, 2, 8, and the like, the camera 20E is provided at a left portion of the radiator guard provided at the rear portion of the vehicle body rear portion 2R.

The camera 20F shoots an image of the shooting area SF defined to be a left area outside the vehicle body 2. The shooting area SF of the camera 20F is defined to spread in a left direction of the vehicle body 2. As illustrated in FIGS. 1, 2, 8, and the like, the camera 20F is provided at a left-side portion of the vehicle body rear portion 2R. In the present embodiment, the camera 20F is provided in the vicinity of a platform which is a middle portion of steps leading to the operator's cabin on the operation platform 3.

The surroundings monitoring system 100 can acquire shot images of the surroundings of the wheel loader 1 using the plurality of the cameras 20.

[Non-contact Sensors]

The non-contact sensors 40 are mounted on the wheel loader 1 and detect an obstacle in the surroundings of the wheel loader 1 in a non-contact manner. As the obstacle, for example, a passenger car is exemplified. The non-contact sensors 40 are arranged inferior to the cameras 20. In the present embodiment, each of the non-contact sensors 40 includes a radar device capable of emitting a radio wave to an obstacle and detecting the obstacle in a non-contact manner. Each of the non-contact sensors 40 may include a laser scanner device capable of emitting laser light to an obstacle and detecting the obstacle in a non-contact manner. In the present embodiment, four non-contact sensors 40 are mounted on the wheel loader 1. By the plurality of non-contact sensors 40 mounted on the wheel loader 1, the surroundings monitoring system 100 can detect obstacles present in different areas in the surroundings of the wheel loader 1.

As illustrated in FIGS. 1, 2, 8, and the like, the non-contact sensors 40 are provided on outer surfaces of the vehicle body 2 of the wheel loader 1 in order to detect an obstacle in the surroundings of the wheel loader 1. In the present embodiment, the non-contact sensors 40 include non-contact sensors 40A, 40B, 40C, and 40D. The non-contact sensor 40A detects obstacles in a right area and a right-posterior area outside the vehicle body 2. The non-contact sensor 40B detects obstacles in a posterior area and a left-posterior area outside the vehicle body 2. The non-contact sensor 40C detects obstacles in a posterior area and a right-posterior area outside the vehicle body 2. The non-contact sensor 40D detects obstacles in a left area and a left-posterior area outside the vehicle body 2. In other words, respective non-contact sensors 40 are installed such that a direction of radio wave emitted from the non-contact sensor 40B and a direction of radio wave emitted from the non-contact sensor 40C intersect, and thereby every obstacle present in the posterior area outside the vehicle body 2 is detected without fail.

In the present embodiment, the non-contact sensors 40A, 40B, 40C, and 40D are provided in the vehicle body rear portion 2R.

Figure 9:
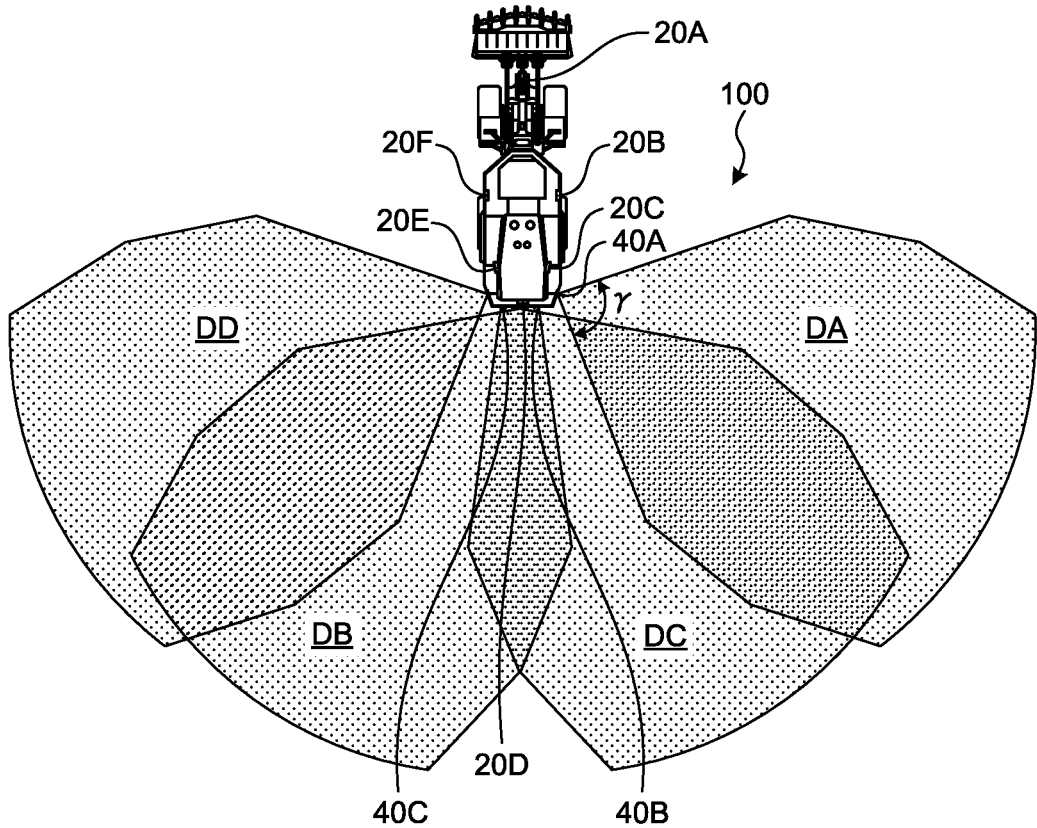
FIG. 9 is a schematic view for explaining detection areas of non-contact sensors according to the first embodiment.
Figure 10:
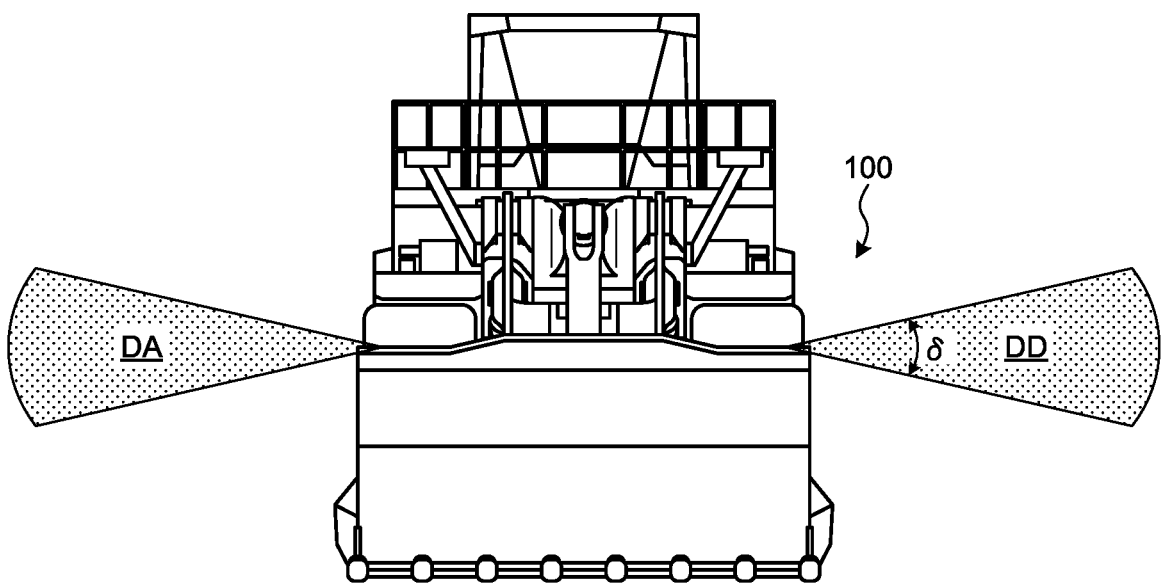
FIG. 10 is a schematic view for explaining the detection areas of the non-contact sensors according to the first embodiment.

FIGS. 9 and 10 are schematic views for explaining respective detection areas DA, DB, DC, and DD of the non-contact sensors 40A, 40B, 40C, and 40D according to the present embodiment. FIG. 9 illustrates the detection areas of the non-contact sensors 40 from a superior view.

FIG. 10 illustrates the detection areas of the non-contact sensors 40 from an anterior or posterior view. The detection areas of the non-contact sensors 40 include an area where emitted radio waves can reach. Each of the non-contact sensors 40 detects an obstacle present in the corresponding detection area.

As illustrated in FIG. 9, a detection angle γ of each of the non-contact sensors 40 in a horizontal direction is about 80[°]. As illustrated in FIG. 10, a detection angle δ of each of the non-contact sensors 40 in a vertical direction is about 30[°].

The non-contact sensor 40A detects an obstacle in the detection area DA defined to be a right area outside the vehicle body 2. The detection area DA of the non-contact sensor 40A is defined to spread in a right direction of the vehicle body 2. As illustrated in FIGS. 2, 8, and the like, the non-contact sensor 40A is provided at a right-side portion of the vehicle body rear portion 2R. In the present embodiment, the non-contact sensor 40A is provided, for example, in the vicinity of a lower portion of the steps leading to the operator's cabin on the operation platform 3.

The non-contact sensor 40B detects an obstacle in the detection area DB defined to be a posterior area and a left-posterior area outside the vehicle body 2. The detection area DB of the non-contact sensor 40B is defined to spread in a posterior direction and a left-posterior direction of the vehicle body 2. As illustrated in FIGS. 2, 8, and the like, the non-contact sensor 40B is provided, for example, at a right portion of a rear bumper provided at a rear portion of the vehicle body rear portion 2R.

The non-contact sensor 40C detects an obstacle in the detection area DC defined to be a posterior area and a right-posterior area outside the vehicle body 2. The detection area DC of the non-contact sensor 40C is defined to spread in a posterior direction and a right-posterior direction of the vehicle body 2. As illustrated in FIGS. 1, 2, 8, and the like, the non-contact sensor 40C is provided, for example, at a left portion of the rear bumper provided at the rear portion of the vehicle body rear portion 2R.

The non-contact sensor 40D detects an obstacle in the detection area DD defined to be a left area outside the vehicle body 2. The detection area DD of the non-contact sensor 40D is defined to spread in a left direction of the vehicle body 2. As illustrated in FIGS. 1, 2, 8, and the like, the non-contact sensor 40D is provided at a left-side portion of the vehicle body rear portion 2R. In the present embodiment, the non-contact sensor 40D is provided, for example, in the vicinity of a lower portion of the steps leading to the operator's cabin on the operation platform 3.

The shooting areas of the cameras 20 and the detection areas of the non-contact sensors 40 at least partially overlap.

[Control Device]

Figure 11:
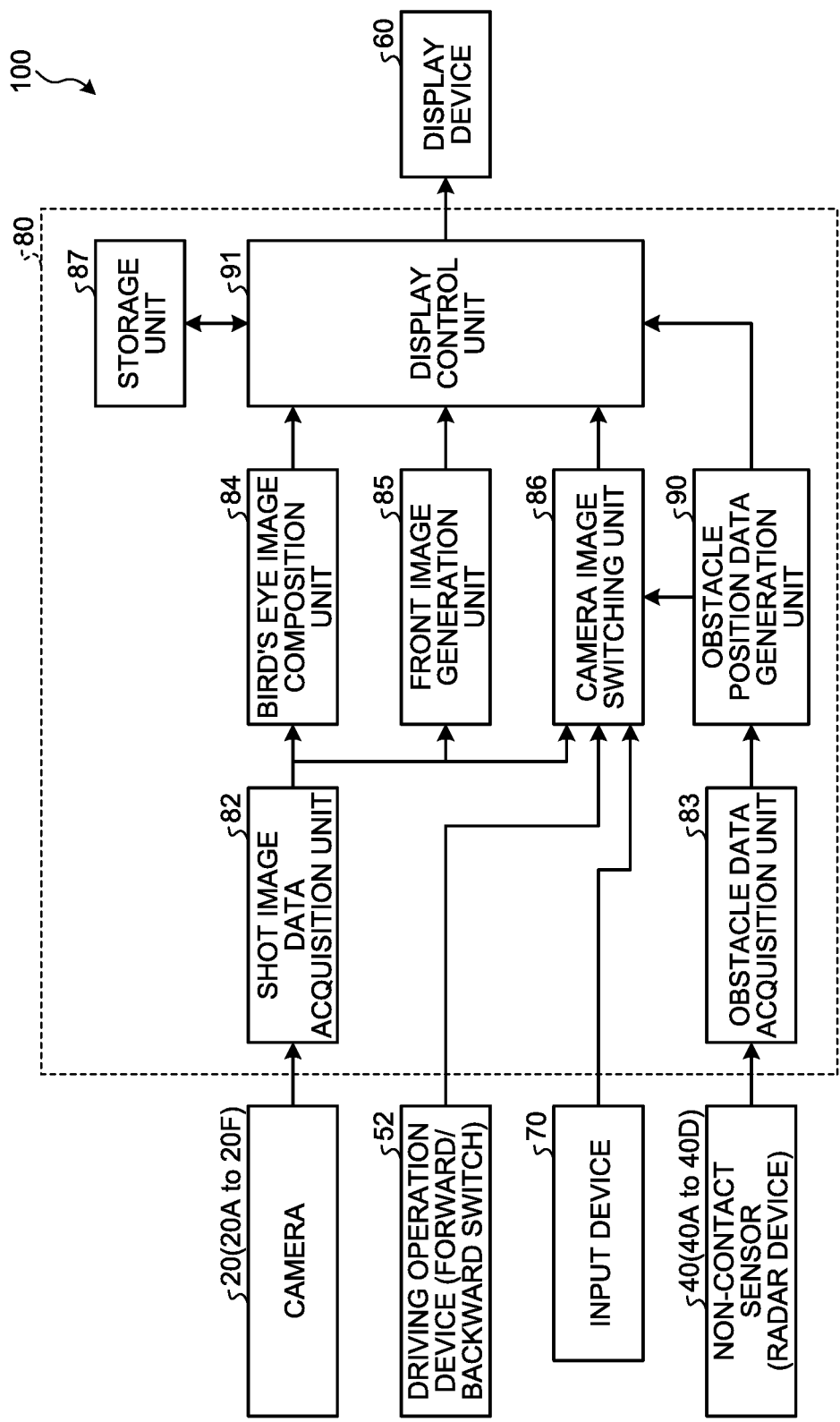
FIG. 11 is a functional block diagram illustrating an example of a surroundings monitoring system including a control device according to the first embodiment.

Next, the control device 80 according to the present embodiment will be described. FIG. 11 is a functional block diagram illustrating an example of the surroundings monitoring system 100 including the control device 80 according to the present embodiment. The control device 80 is connected to each of the plurality of cameras 20, a driving operation device 52 including a forward/backward switch, an input device 70, the plurality of non-contact sensors 40, and the display device 60. The control device 80, the plurality of cameras 20, the driving operation device 52, the input device 70, the plurality of non-contact sensors 40, and the display device 60 are mounted on the wheel loader 1.

The control device 80 includes a computer system. The control device 80 has a processor such as a central processing unit (CPU), and a storage device including a non-volatile memory such as a read only memory (ROM) or storage and a volatile memory such as a random access memory (RAM).

The display device 60 and the input device 70 are arranged in the operator's cabin on the operation platform 3. The display device 60 includes a flat panel display such as a liquid crystal display (LCD) or an organic electroluminescence display (OELD). The input device 70 includes at least one of a switch button, a computer keyboard, a mouse, and a touch sensor provided on a display screen of the display device 60. The control device 80 outputs display data to the display device 60. The operator of the wheel loader 1 can visually observe the display data displayed on the display device 60. The display device 60 displays the display data output from the control device 80 on the display screen. The input device 70 is operated by the operator of the wheel loader 1. The input device 70, by being operated by the operator, generates input data and outputs the data to the control device 80.

The control device 80 includes a shot image data acquisition unit 82, an obstacle data acquisition unit 83, a bird's eye image composition unit 84, a front image generation unit 85, a camera image switching unit 86, a storage unit 87, an obstacle position data generation unit 90, and a display control unit 91.

The shot image data acquisition unit 82 acquires, from the cameras 20, respectively, shot image data indicating shot images respectively shot by the cameras 20 mounted on the wheel loader 1.

The obstacle data acquisition unit 83 acquires, from the non-contact sensors 40, respectively, obstacle data indicating obstacles respectively detected by the non-contact sensors 40 mounted on the wheel loader 1.

The bird's eye image composition unit 84 performs image processing of a plurality of the shot image data acquired by the shot image data acquisition unit 82 to generate bird's eye image data indicating a bird's eye image BI of the surroundings of the wheel loader 1. In the present embodiment, the bird's eye image composition unit 84 generates the bird's eye image data of the surroundings of the wheel loader 1 based on the plurality of shot image data acquired by the cameras 20B, 20C, 20D, 20E, and 20F provided in the vehicle body rear portion 2R.

The front image generation unit 85 generates front image data indicating an image of an anterior area outside the wheel loader 1 based on the shot image data acquired by the shot image data acquisition unit 82. The front image generation unit 85 generates front image data based on the shot image data acquired by the camera 20A provided in the vehicle body front portion 2F.

The camera image switching unit 86 selects specific shot image datum from the shot image data respectively shot by the cameras 20. In the present embodiment, the camera image switching unit 86 selects the specific shot image datum from the shot image data based on an operation signal of the forward/backward switch of the driving operation device 52. The camera image switching unit 86 can select the specific shot image datum from the shot image data based on the input data generated by the input device 70.

The storage unit 87 stores first projection position data indicating a first projection position PL1. The first projection position PL1 is a position obtained by projecting a first site SL1 of the working implement 10 on a predetermined plane FL illustrated in FIGS. 12 and 13. In addition, the storage unit 87 stores second projection position data indicating a second projection position PL2. The second projection position PL2 is a position obtained by projecting second sites SL2 of the front tires 6F on the predetermined plane FL. In the present embodiment, the predetermined plane FL includes the ground-contacting surfaces of the front tires 6F which contact the ground surface RS. In the present embodiment, the plane FL substantially includes the ground surface RS.

Figure 12:
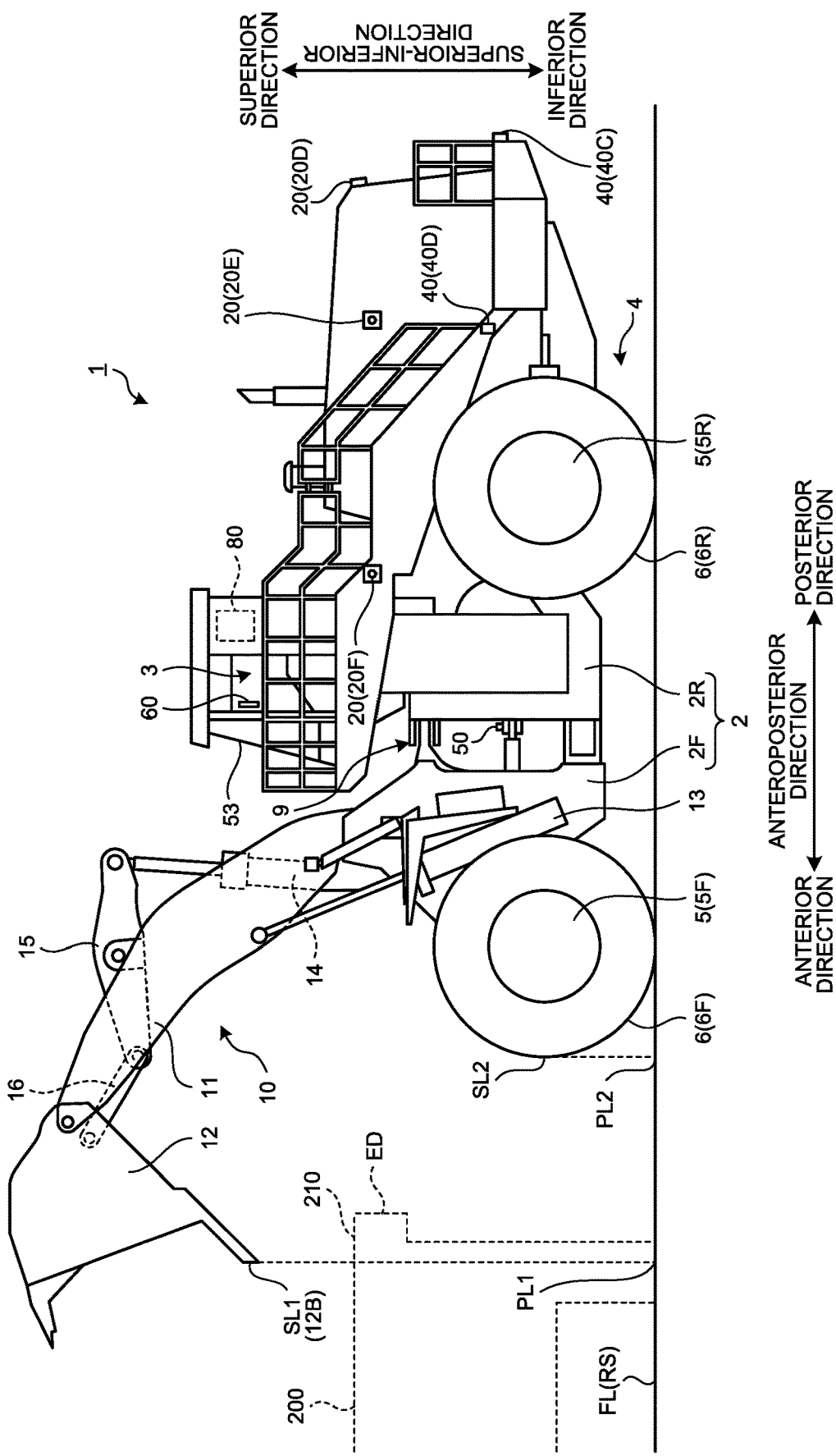
FIG. 12 is a schematic view for explaining a first projection position and a second projection position according to the first embodiment.
Figure 13:
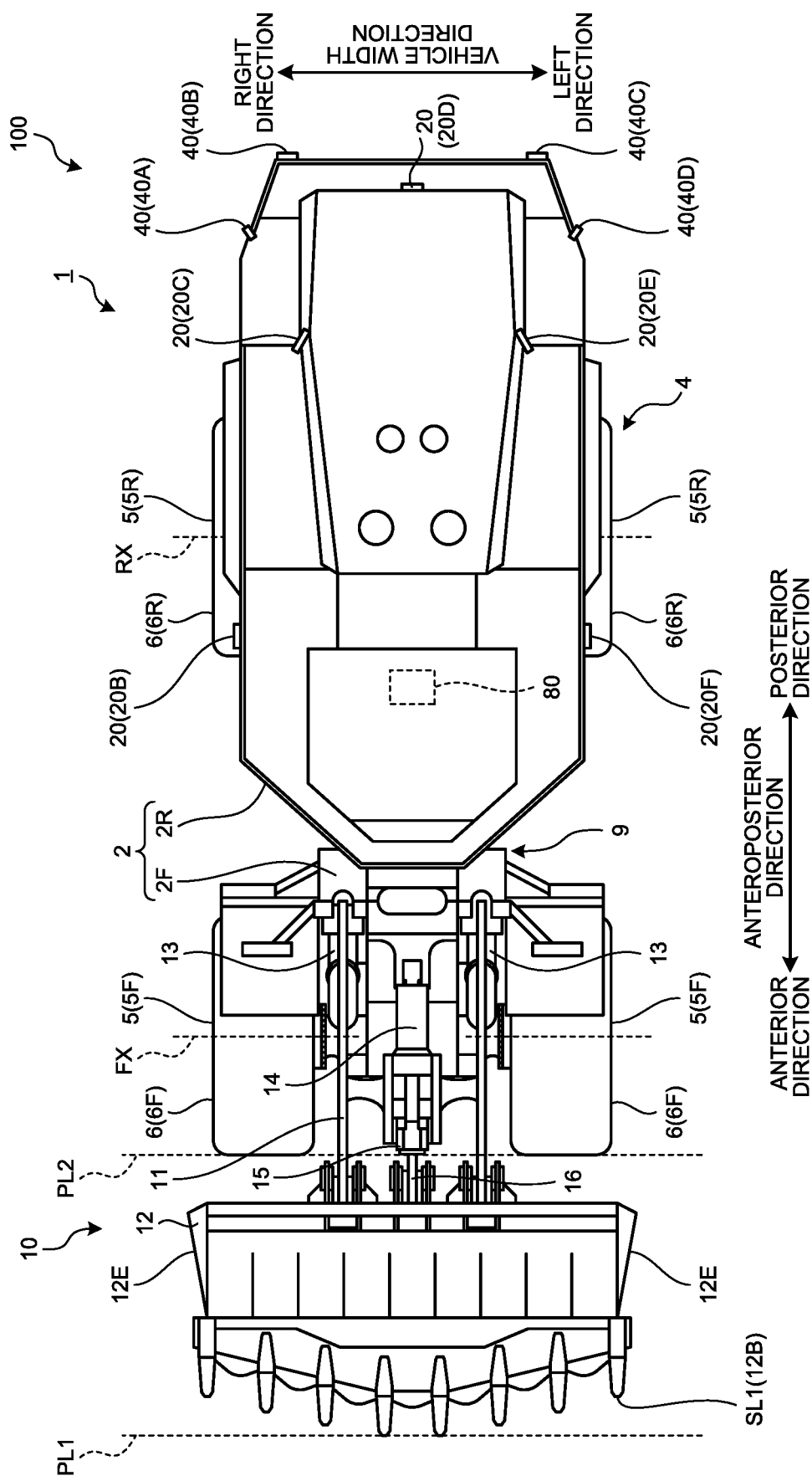
FIG. 13 is a schematic view for explaining the first projection position and the second projection position according to the first embodiment.

FIGS. 12 and 13 are schematic views for explaining the first projection position PL1 and the second projection position PL2 according to the present embodiment. FIG. 12 illustrates the wheel loader 1, the first projection position PL1, and the second projection position PL2 from a lateral view. FIG. 13 illustrates a part of the wheel loader 1, the first projection position PL1, and the second projection position PL2 from a superior view. Dashed lines illustrated in FIG. 12 schematically illustrate a transport vehicle 200 of a predetermined vehicle size class. As illustrated in FIGS. 12 and 13, the first projection position PL1 is a position obtained by projecting the first site SL1 of the working implement 10 on the plane FL. The first projection position PL1 is a position same as that of the first site SL1 of the working implement 10 in a plane in parallel with the plane FL. In other words, the first projection position PL1 is a position where a virtual line, which is perpendicular to the plane FL and passing through the first site SL1, intersects the plane FL.

The first projection position PL1 is defined based on a position of the first site SL1 when the working implement 10 is maintained at a predetermined attitude. It is possible to derive, from design data or specification data of the wheel loader 1, the position of the first site SL1 in a plane in parallel with the plane FL when the working implement 10 is maintained at the predetermined attitude. In the present embodiment, the position of the first site SL1 of the working implement 10 when the working implement 10 is maintained at the predetermined attitude, and the first projection position PL1 obtained by projecting the first site SL1 on the plane FL are known data, and stored in the storage unit 87.

In the present embodiment, each of the first site SL1 and the first projection position PL1 has a predetermined length in the vehicle width direction. In the present embodiment, the first site SL1 of the working implement 10 includes the distal end 12B of the bucket 12. The first projection position SL1 is defined based on the distal end 12B of the bucket 12 when the working implement 10 is maintained at the predetermined attitude.

In the present embodiment, the predetermined attitude of the working implement 10 is an attitude obtained when the boom 11 is arranged at the upper end of the range of movement of the boom 11, and the bucket 12 is arranged at the lower end of the range of movement of the bucket 12. In other words, as illustrated in FIG. 12, the first site SL1 of the working implement 10 includes the distal end 12B of the bucket 12 when the boom 11 after a raising operation is arranged at the upper end of the range of movement of the boom 11, and the bucket 12 after a dump operation is arranged at the lower end of the range of movement of the bucket 12.

In the following description, the attitude of the working implement 10, which is observed when the boom 11 is arranged at the upper end of the range of movement of the boom 11 and the bucket 12 is arranged at the lower end of the range of movement of the bucket 12, is appropriately referred to as a dumping reach attitude.

It is possible to derive, from the design data or the specification data of the wheel loader 1, the position of the distal end 12B of the bucket 12 in the dumping reach attitude in a plane in parallel with the plane FL and the first projection position PL1 obtained by projecting the distal end 12B of the bucket 12 on the plane FL. When the bucket 12 is removed and a bucket 12 having a different dimension or shape is attached instead thereof, the first projection position PL1 is changed based on design data of the attached bucket 12. For example, the input device 70 is used to cause the storage unit 87 to store the design data of the attached bucket 12.

The predetermined attitude of 10 of the working implement may not necessarily be the dumping reach attitude in which the boom 11 is arranged at the upper end of the range of movement of the boom 11, and the bucket 12 is arranged at the lower end of the range of movement of the bucket 12. The first projection position PL1 may be a position obtained by projecting the distal end 12B of the bucket 12 on the plane FL when the working implement 10 is in a predetermined attitude different from the dumping reach attitude. For example, the predetermined attitude of the working implement 10 may be an attitude of the working implement 10 observed when the boom 11 is arranged at the upper end of the range of movement of the boom 11, and the bucket 12 is arranged at the upper end of the range of movement of the bucket 12.

The second projection position PL2 is a position obtained by projecting the second sites SL2 of the front tires 6F on the plane FL. The second projection position PL2 is a position same as positions of the second sites SL2 of the front tires 6F in a plane in parallel with the plane FL. The second sites SL2 and the second projection position PL2 are long in the vehicle width direction.

It is possible to derive, from the design data or the specification data of the wheel loader 1, the positions of the second sites SL2 in a plane in parallel with the plane FL. The positions of the second sites SL2 of the front tires 6F and the second projection position PL2 obtained by projecting the second sites SL2 on the plane FL are known data, and stored in the storage unit 87.

As illustrated in FIG. 12, in the present embodiment, the second sites SL2 of the front tires 6F include, for example, front ends of the front tires 6F.

The obstacle position data generation unit 90 generates obstacle position data indicating a position of an obstacle based on the obstacle data acquired by the obstacle data acquisition unit 83.

The display control unit 91 causes the display device 60 to simultaneously display the bird's eye image BI generated by the bird's eye image composition unit 84 and a character image CG of the wheel loader 1 from a superior view. In the present embodiment, the display control unit 91 causes the display device 60 to display the character image CG of the wheel loader 1 in a central portion of the display screen of the display device 60, and to display the bird's eye image BI around a representative image on the display screen of the display device 60. Details of the representative image will be described later.

The display control unit 91 causes the display device 60 to display a mark 63 indicating a position of an obstacle based on the obstacle position data generated by the obstacle position data generation unit 90. The display control unit 91 causes the display device 60 to display the mark 63 indicating a position of an obstacle in such a manner as to overlap the bird's eye image BI.

In the present embodiment, the display control unit 91 causes the display device 60 to display a shot image shot by the camera 20A and a first guide image Ld which indicates the first projection position PL1 in a superimposed manner. The display control unit 91 causes the display device 60 to display a second guide image Le which indicates the second projection position PL2.

In the present embodiment, the display control unit 91 causes the display device 60 to display the shot image shot by the camera 20A, the first guide image Ld which indicates the first projection position PL1 obtained by projecting the distal end 12B of the bucket 12, and the second guide image Le which indicates the second projection position PL2 obtained by projecting the distal ends of the front tires 6F in a superimposed manner.

Figure 14:
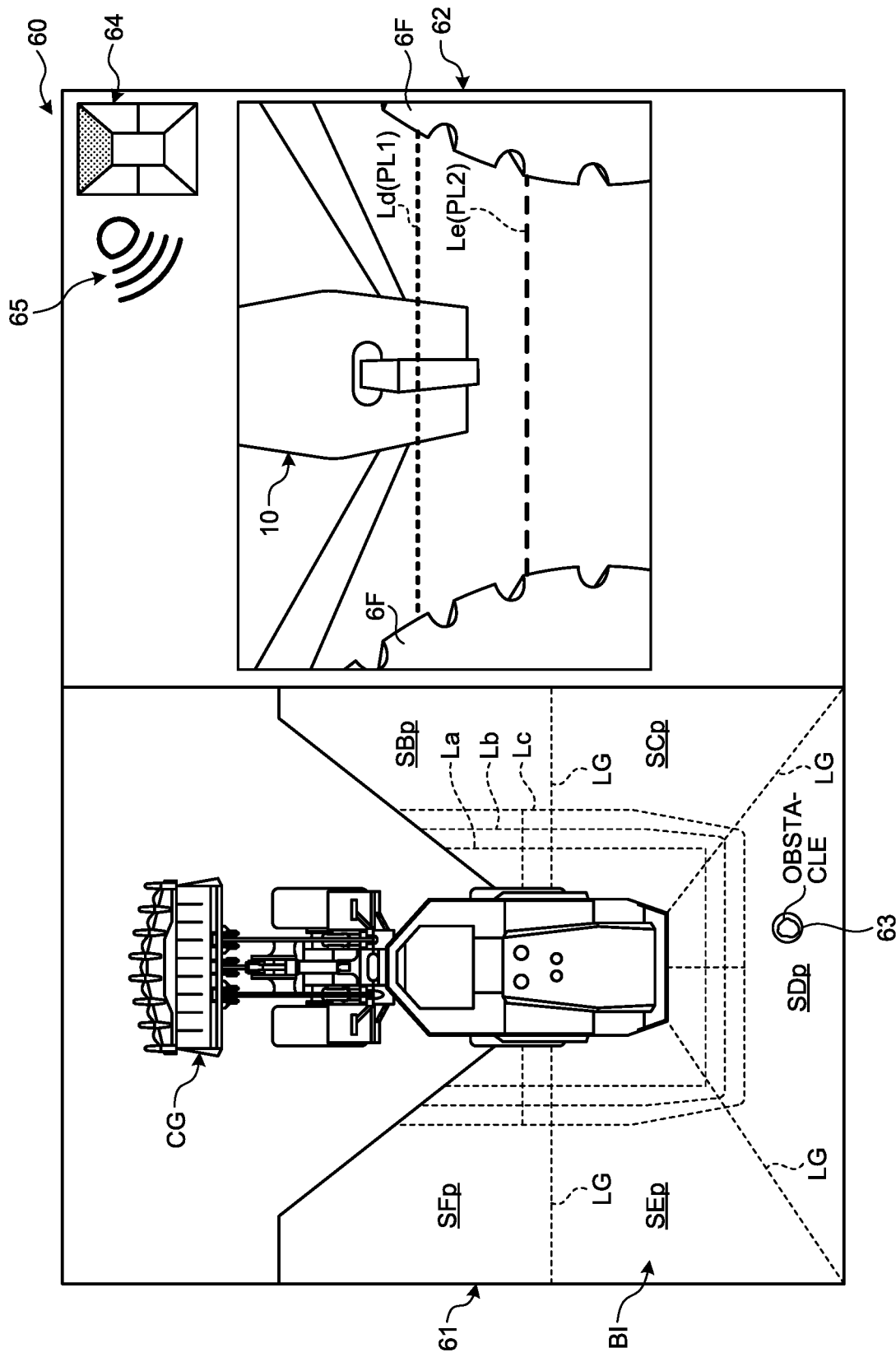
FIG. 14 is a view schematically illustrating an example of a display device according to the first embodiment.

FIG. 14 is a view schematically illustrating an example of the display device 60 according to the present embodiment. As illustrated in FIG. 14, in the present embodiment, the display control unit 91 causes the display device 60 to display the character image CG of the wheel loader 1 and the bird's eye image BI in a first area 61 of the display screen of the display device 60, and to display a shot image by the camera 20A in a second area 62 of the display screen adjacent to the first area 61.

The display control unit 91 causes lines LG to be displayed on the bird's eye image BI in an overlapping manner. The lines LG indicate borders between respective shooting areas SBp, SCp, SDp, SEp, and SFp of the cameras 20B, 20C, 20D, 20E, and 20F which acquire shot image data for generating the bird's eye image BI. The shooting areas SBp, SCp, SDp, SEp, and SFp indicate image data corresponding to the actual shooting areas SBp, SCp, SDp, SEp, and SFp of the cameras 20B, 20C, 20D, 20E, and 20F, respectively.

The display control unit 91 causes lines La, Lb, and Lc indicating distance from an outer periphery of the wheel loader 1 to be displayed on the bird's eye image BI in an overlapping manner. The outer periphery of the wheel loader 1 is a line which forms an outer shape of the wheel loader 1 indicated in a planar view of the wheel loader 1 from a superior view when the wheel loader 1 is in an attitude which allows the wheel loader 1 to travel in a straight line. In the example illustrated in FIG. 13, the line La indicates a position at 3 [m] from the outer periphery of the wheel loader 1, the line Lb indicates a position at 5 [m] from the outer periphery of the wheel loader 1, and the line Lc indicates a position at 7 [m] from the outer periphery of the wheel loader 1. The distance indicated by each of the lines La, Lb, and Lc is by way of example only, and may be set arbitrarily. The number of lines which indicate distance from the outer periphery of the wheel loader 1 may not necessarily be three, and may be one or two, or arbitrary numbers of four or more.

The display control unit 91 causes the mark 63 indicating a position of an obstacle detected by the non-contact sensors 40 to be displayed on the bird's eye image BI in an overlapping manner. For example, when an obstacle present in a posterior area outside the wheel loader 1 is detected by the non-contact sensors 40, the display control unit 91 causes the mark 63 to be displayed on the obstacle displayed in the bird's eye image BI in an overlapping manner based on the obstacle position data indicating a position of the obstacle generated by the obstacle position data generation unit 90. Consequently, the presence of the obstacle is displayed with an emphasis, and thereby the operator of the wheel loader 1 can recognize the presence of the obstacle quickly. Here, the display control unit 91 may cause the mark 63 to be displayed in a blinking manner. In the present embodiment, the display control unit 91 causes, among the shooting areas SBp, SCp, SDp, SEp, and SFp, a shooting area where the obstacle is present to be highlighted. For example, the display control unit 91 can cause the shooting area where the obstacle is present to be displayed in a color different from that of other shooting areas where no obstacle is present, or to be displayed in a blinking manner. The display control unit 91 may cause a contour of the shooting area where the obstacle is present to be displayed in a blinking manner.

The shot image acquired by the shot image data acquisition unit 82 is displayed in the second area 62. In FIG. 14, a shot image indicating an anterior area outside the wheel loader 1, which has been shot by the camera 20A and subjected to image processing in the front image generation unit 85, is displayed.

The first guide image Ld which indicates the first projection position PL1 of the distal end 12B of the bucket 12 in the dumping reach attitude, and the second guide image Le which indicates the second projection position PL2 of the front ends of the front tires 6F are displayed in the second area 62. As an example, the first projection position PL1 is a position at 1.3 [m] anterior to the installation position of the camera 20A. The second projection position PL2 is a position at 3.8 [m] anterior to the installation position of the camera 20. The first guide image Ld and the second guide image Le may be displayed in a display mode using a dashed line as illustrated in FIG. 14, or may be displayed in a display mode using a solid line. The first guide image Ld and the second guide image Le may be respectively displayed in display modes similar to each other, or may be respectively displayed in display modes different from each other (display modes having types of lines or colors different from each other). For example, one may be displayed by a red line and another may be displayed by a yellow line, or one may be displayed by a solid line and another may be displayed by a dashed line.

In the present embodiment, the first guide image Ld includes a first guide line in parallel with the rotation axis FX of the front tires 6F. The second guide image Le includes a second guide line in parallel with the rotation axis FX of the front tires 6F.

In the present embodiment, when the wheel loader 1 is about to start traveling forward, or is traveling forward (hereinafter referred to as "in forward traveling"), the display control unit 91 causes a shot image shot by the camera 20A and indicating an anterior area outside the wheel loader 1 to be displayed in the second area 62. On the other hand, when the wheel loader 1 is about to start traveling backward, or is traveling backward (hereinafter referred to as "in backward traveling"), the display control unit 91 causes a shot image shot by the camera 200 and indicating a posterior area outside the wheel loader 1 to be displayed in the second area 62.

In the present embodiment, the operation signal of the forward/backward switch of the driving operation device 52 is input to the camera image switching unit 86. The camera image switching unit 86 outputs, to the display control unit 91, command data for switching shot images to be displayed in the second area 62 based on the operation signal output from the driving operation device 52. When the wheel loader 1 is traveling forward, and command data for displaying a shot image of an anterior area outside the wheel loader 1 is acquired from the camera image switching unit 86, the display control unit 91 causes the shot image shot by the camera 20A to be displayed in the second area 62. When the wheel loader 1 is traveling backward, and command data for displaying a shot image of a posterior area outside the wheel loader 1 is acquired from the camera image switching unit 86, the display control unit 91 causes the shot image shot by the camera 20D to be displayed in the second area 62.

In addition, an indicator 64 is displayed in the second area 62. The indicator 64 indicates, among respective shooting areas of cameras 20, a shooting area of the camera 20 displayed in the second area 62. Further, an icon 65 which indicates operation states of the non-contact sensors 40 is displayed in the second area 62.

The display control unit 91 may cause the display device 60 to display, not the second area 62, but a representative image selected by the driving operation device 52 in the central portion of the display screen of the display device 60, and to display the bird's eye image BI around the representative image on the display screen of the display device 60. Alternatively, the display control unit 91 may cause the display device 60 to display, not the first area 61, but a shot image shot by any one camera 20 of the cameras 20A, 20B, 20C, 20D, 20E, and 20F. In other words, the display control unit 91 may cause the display device 60 to perform so-called two-screen display, or one-screen display.

Figure 15:
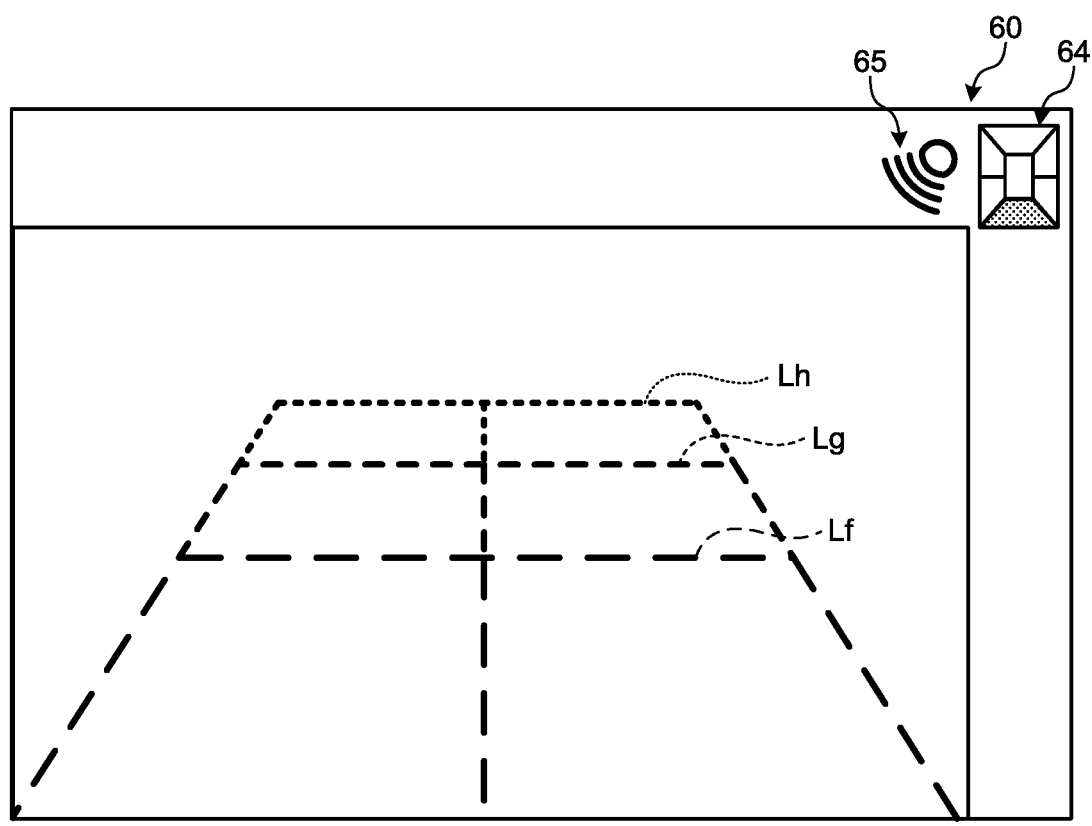
FIG. 15 is a view schematically illustrating an example of the display device according to the first embodiment.

FIG. 15 is a view illustrating a display example of the display device 60 when the wheel loader 1 according to the present embodiment is about to start traveling backward, or is traveling backward. When the wheel loader 1 is in backward traveling, the display control unit 91 causes the display device 60 to automatically display a shot image shot by the camera 20D and indicating a posterior area outside the wheel loader 1. FIG. 15 illustrates an example in which one-screen display of the shot image shot by the camera 20D is performed. In the example illustrated in FIG. 15, the display control unit 91 causes lines Lf, Lg, and Lh indicating distance from a rear end of the wheel loader 1 to be displayed on the shot image in an overlapping manner. The rear end of the wheel loader 1 can be set, for example, to a rear end of the rear bumper provided at a rearmost portion of the vehicle body rear portion 2R. The number of lines which indicate distance from the rear end of the wheel loader 1 may not necessarily be three, and may be one or two, or arbitrary numbers of four or more.

In a case where an obstacle present in a lateral area (right or left area) outside the wheel loader 1 is detected by the non-contact sensors 40 when the wheel loader 1 is in backward traveling, the display control unit 91 may select, based on the obstacle position data indicating a position of the obstacle generated by the obstacle position data generation unit 90, shot image data of the shooting area where the obstacle is present and cause the display device 60 to display the shot image data. For example, in a case where the non-contact sensor 40A detects that an obstacle is present in the shooting area SB of the camera 20B when the wheel loader 1 is in backward traveling, the display control unit 91 switches shot image data being displayed on the display device 60 from a shot image acquired by the camera 20D to a shot image acquired by the camera 20B. In other words, the shot image displayed on the display device 60 is automatically switched to the shot image including the obstacle. Consequently, the operator can visually observe condition of the obstacle and a relationship between relative positions of the wheel loader 1 and the obstacle.

Figure 16:
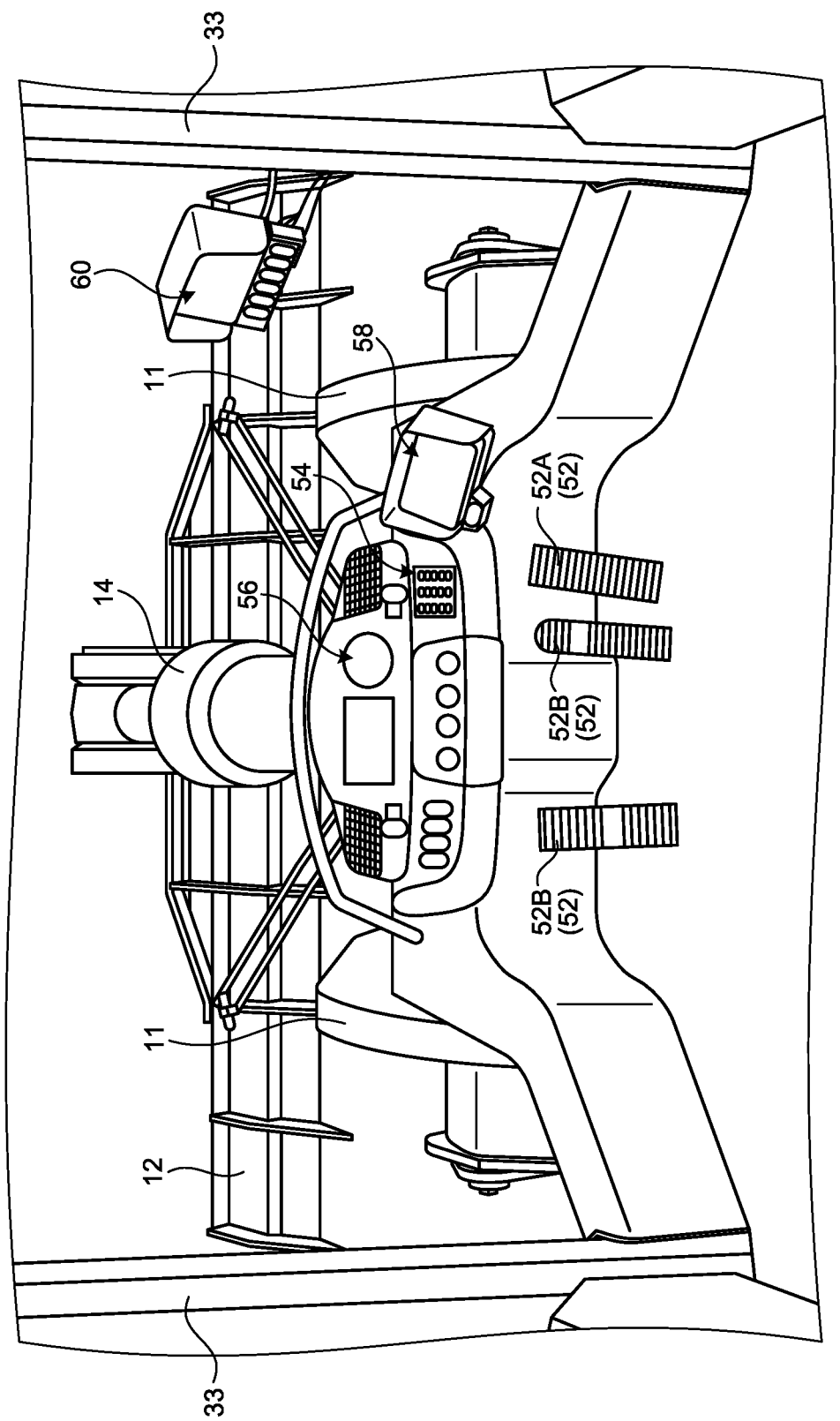
FIG. 16 is a view schematically illustrating an example of an operator's cabin according to the first embodiment.

FIG. 16 is a view schematically illustrating an example of the operator's cabin on the operation platform 3 according to the present embodiment. FIG. 16 schematically illustrates a scene viewed by the operator sitting on the operator's seat in the operator's cabin.

The display device 60 is arranged in the operator's cabin of the vehicle body 2. The operator can take a look at the display device 60 provided in the operator's cabin to check surrounding conditions of the wheel loader 1.

A plurality of devices is provided in the operator's cabin. Examples of the devices include an accelerator pedal 52A and left and right brake pedals 52B, which are included in the driving operation device 52, an operation panel 54, a monitor device 56, and a rear-view monitor device 58. A windshield is provided at a front portion of the operator's cabin. The windshield is supported by pillars 33 of the operator's cabin. The display device 60 is supported by the pillar 33. Since the display device 60 is supported by the pillar 33, the operator can visually observe outside circumstances through the windshield without being shielded by the display device 60.

Although the operator in the operator's cabin can visually observe the boom 11, the bucket 12, the bucket cylinder 14, and the like, through the windshield in the wheel loader 1 as illustrated in FIG. 16, it is difficult to visually observe surrounding conditions of the wheel loader 1 including the ground surface RS. In particular, when the wheel loader 1 is a large one, the operation platform 3 is disposed at a position high above the ground surface RS, which makes it difficult for the operator to visually observe condition of the ground surface RS directly.

In the present embodiment, shot image data of the surroundings of the wheel loader 1 is acquired by the cameras 20 and displayed on the display device 60. When an obstacle is present in the surroundings of the wheel loader 1, the obstacle is detected by the non-contact sensors 40. When an obstacle is present, the obstacle is displayed on the display device 60 as shot image data, and simultaneously therewith, a position of the obstacle is displayed on the display device 60. Consequently, the operator can smoothly grasp surrounding conditions of the wheel loader 1.

[Surroundings Monitoring Method]

Next, a surroundings monitoring method for a work vehicle according to the present embodiment will be described. For example, when using the wheel loader 1 to load excavated material into a vessel of a transport vehicle, the operator causes the wheel loader 1 to travel forward to the transport vehicle with the excavated material retained in the bucket 12.

As illustrated in FIG. 14, the first guide image Ld which indicates the first projection position PL1 obtained by projecting the first site SL1 of the working implement 10 is displayed on the display device 60. Consequently, even though it is difficult to view the first site SL1 of the working implement 10, the operator can recognize the position of the first site SL1 of the working implement 10 by seeing the first guide image Ld1 of the display device 60.

In the present embodiment, the first guide image Ld indicates the first projection position PL1 obtained by projecting, on the plane FL (ground surface RS), the distal end 12B of the bucket 12 when the working implement 10 is in the dumping reach attitude. As illustrated in FIG. 12, the dumping reach attitude is an attitude observed when a process for discharging, from the bucket 12, excavated material retained in the bucket 12 is completed in a loading operation for loading the excavated material into a vessel 210 of the transport vehicle 200 by using the working implement 10 of the wheel loader 1.

When causing the wheel loader 1 to travel forward to the transport vehicle 200 for the purpose of performing a loading operation, the operator of the wheel loader 1 adjusts a position of the wheel loader 1 with respect to the transport vehicle 200 while seeing the first guide image Ld such that an end ED of the vessel 210 of the transport vehicle 200 facing the wheel loader 1 is arranged on a wheel loader 1 side (near side) of the first guide image Ld. Consequently, the wheel loader 1 can smoothly load the excavated material into the vessel 210 in the loading operation.

In other words, when the loading operation is performed in a state where the end ED of the vessel 210 of the transport vehicle 200 facing the wheel loader 1 is located anterior to the distal end 12B of the bucket 12 in the dumping reach attitude, it is more likely that some of the excavated material discharged from the bucket 12 drops not into the vessel 210 but to an outside (near side) of the vessel 210. In the present embodiment, the first guide image Ld which indicates the first projection position PL1 of the distal end 12B of the bucket 12 in the dumping reach attitude is displayed on the display device 60. Therefore, the operator can adjust relative positions of the transport vehicle 200 and the wheel loader 1 while seeing the display device 60 such that the end ED of the vessel 210 of the transport vehicle 200 facing the wheel loader 1 is arranged on a wheel loader 1 side (near side) of the distal end 12B of the bucket 12 in the dumping reach attitude. By performing the loading operation for discharging the excavated material in the bucket 12 into the vessel 210 in a state where the end ED of the vessel 210 is arranged on the wheel loader 1 side of the first guide image Ld, the excavated material is prevented from being discharged to the outside of the vessel 210, and is loaded into the vessel 210 smoothly.

In the present embodiment, the second guide image Le which indicates the second projection position PL2 obtained by projecting the second sites SL2 of the front tires 6F is displayed on the display device 60. Consequently, even though it is difficult to view the second sites SL2 of the front tires 6F, the operator can recognize the positions of the second sites SL2 of the front tires 6F by seeing the second guide image Le of the display device 60.

In the present embodiment, the second guide image Le indicates the second projection position PL2 obtained by projecting, on the plane FL (ground surface RS), the front ends of the front tires 6F. As illustrated in FIG. 12, the front tires 6F and the transport vehicle 200 are preferable to be separated from each other by an appropriate distance in a loading operation.

When causing the wheel loader 1 to travel forward to the transport vehicle 200 for the purpose of performing a loading operation, the operator of the wheel loader 1 adjusts a position of the wheel loader 1 with respect to the transport vehicle 200 while seeing the second guide image Le such that the end ED of the transport vehicle 200 facing the wheel loader 1 is arranged on a side anterior to the second guide image Le. Consequently, contact between the wheel loader 1 and the transport vehicle 200 is suppressed and the wheel loader 1 can smoothly load the excavated material into the vessel 210 in the loading operation.

In other words, in the present embodiment, the operator of the wheel loader 1 adjusts the relative positions of the wheel loader 1 and the transport vehicle 200 in the loading operation while seeing the display device 60 such that the end ED of the transport vehicle 200 facing the wheel loader 1 is arranged between the first guide image Ld and the second guide image Le. Consequently, the loading operation is smoothly performed.

[Effects]

As described above, according to the present embodiment, since the first guide image Ld is displayed on the display device 60, the operator of the wheel loader 1 can accurately recognize the relative positions of the wheel loader 1 and the transport vehicle 200 by seeing the display device 60 even in a situation where it is difficult to visually recognize the relative positions of the wheel loader 1 and the transport vehicle 200 accurately. Therefore, the operator can appropriately adjust the relative positions of the wheel loader 1 and the transport vehicle 200 in the loading operation.

In the present embodiment, the first projection position PL1 is a position obtained by projecting the distal end 12B of the bucket 12 on the plane FL. Therefore, when performing the loading operation with the bucket 12, the operator can appropriately adjust the relative positions of the bucket 12 and the vessel 210 of the transport vehicle 200.

In the present embodiment, the first projection position PL1 is a position obtained by projecting the distal end 12B of the bucket 12 in the dumping reach attitude on the plane FL. Therefore, as described with reference to FIG. 12, the excavated material in the bucket 12 is prevented from being discharged to the outside of the vessel 210 in the loading operation.

In the present embodiment, the operator of the wheel loader 1 can more appropriately adjust the relative positions of the wheel loader 1 and the transport vehicle 200 by the second guide image Le displayed on the display device 60. In the present embodiment, the second projection position PL2 is a position obtained by projecting the front ends of the front tires 6F on the plane FL. Therefore, when performing the loading operation, the operator can more appropriately adjust the relative positions of the wheel loader 1 and the transport vehicle 200 while seeing the second guide image Le.

In other words, by adjusting the relative positions of the wheel loader 1 and the transport vehicle 200 such that the end ED of the transport vehicle 200 arranged at a closest position viewed from the wheel loader 1 is arranged between the first guide image Ld and the second guide image Le, the wheel loader 1 can smoothly perform the loading operation without being too close to the transport vehicle 200 or too far away from the transport vehicle 200.

In the present embodiment, the camera 20A is mounted which shoots an image of an anterior area outside the wheel loader 1. Consequently, in forward traveling of the wheel loader 1, the operator can visually observe condition of the ground surface RS in an anterior area outside the front tires 6F by seeing the display device 60. For example, when there is a stone with a sharp corner in the anterior area outside any of the front tires 6F, the front tire 6F may be damaged when running on the stone. According to the present embodiment, the operator can visually observe condition of the ground surface RS in the anterior area outside the front tires 6F by seeing the display device 60. Therefore, when recognizing the presence of an obstacle in the anterior area outside the front tires 6F, the operator can take measures for suppressing damage of the front tires 6F. For example, in order to prevent the front tires 6F from running over the obstacle, the operator can operate a brake pedal to stop the wheel loader 1 or change a travel direction of the wheel loader 1.

Figure 17:
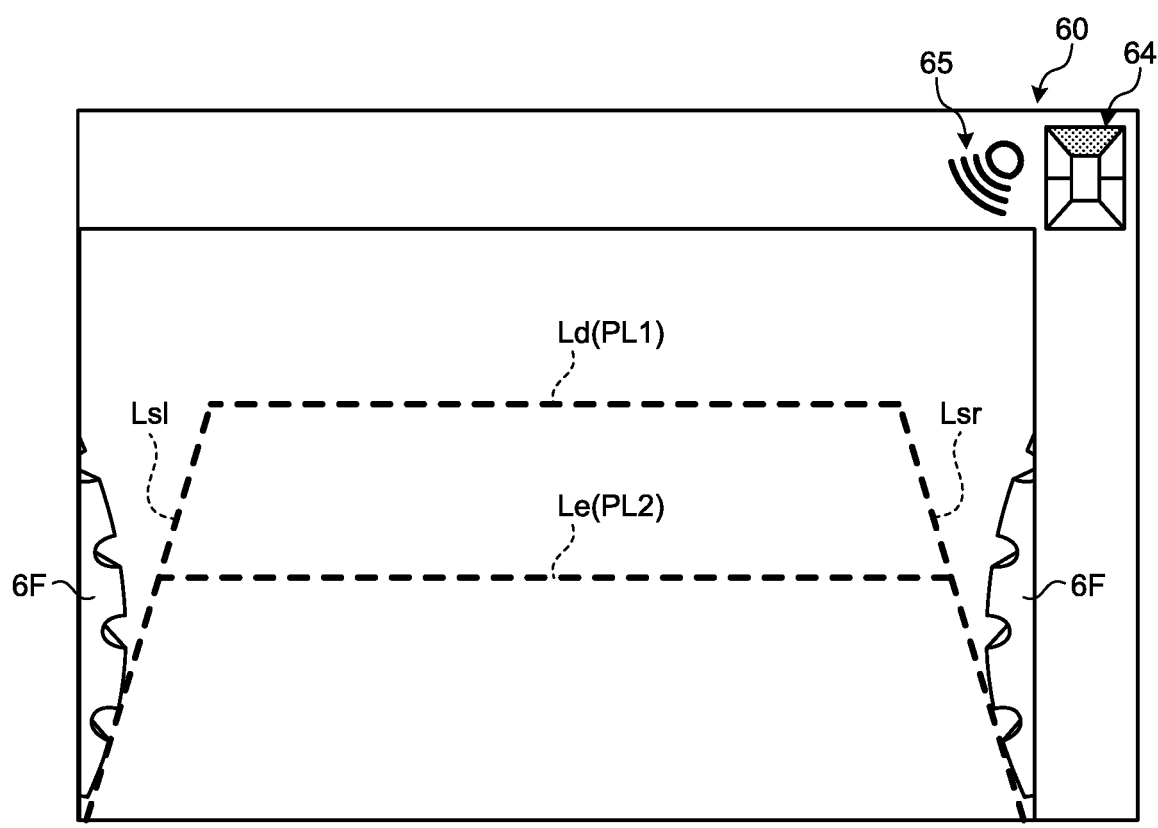
FIG. 17 is a view schematically illustrating an example of the display device according to the first embodiment.

In the above embodiment, it has been assumed that the first guide image Ld includes the first guide line in parallel with the rotation axis FX of the front tires 6F, and the second guide image Le includes the second guide line in parallel with the rotation axis FX of the front tires 6F. A guide line other than the first guide line and the second guide line may be displayed on the display device 60. FIG. 17 is a view illustrating a display example of the display device 60 according to the present embodiment. In FIG. 17, illustration of the working implement 10 is omitted. As illustrated in FIG. 17, the display control unit 91 may display a guide line Lsr and a guide line Lsl. The guide line Lsr is an image indicating a projection position of a side portion (side wall portion) of the front tire 6F located on a right side in the vehicle width direction. The guide line Lsl is an image indicating a projection position of a side portion of the front tire 6F located on a left side in the vehicle width direction.

As described above, the second sites of the front tires 6F may include the side portions of the front tires 6F, and the second guide image which indicates the second projection position obtained by projecting the second sites of the front tires 6F on the plane FL may include an image which indicates a projection position obtained by projecting the side portions of the front tires 6F on the plane FL. Consequently, the operator can recognize not only positions of the front tires 6F in the anteroposterior direction, but also positions of the front tires 6F in the vehicle width direction.

In the example illustrated in FIG. 17, it has been assumed that guide lines are displayed which indicate projection positions of inner side portions of the front tires 6F in the vehicle width direction. Guide lines may be displayed which indicate projection positions of outer side portions of the front tires 6F in the vehicle width direction.

Second Embodiment

A second embodiment will be described. In the following description, components which are same as or similar to those in the above embodiment are denoted by the same reference signs, and descriptions thereof will be simplified or omitted.

In the first embodiment described above, it has been assumed that the driving operation device 52, the display device 60, and the control device 80 are mounted on the wheel loader 1. The driving operation device 52 and the display device 60 may be provided in a remote location from the wheel loader 1. A part or whole of a plurality of functions of the control device 80 may be provided in the remote location from the wheel loader 1.

Figure 18:
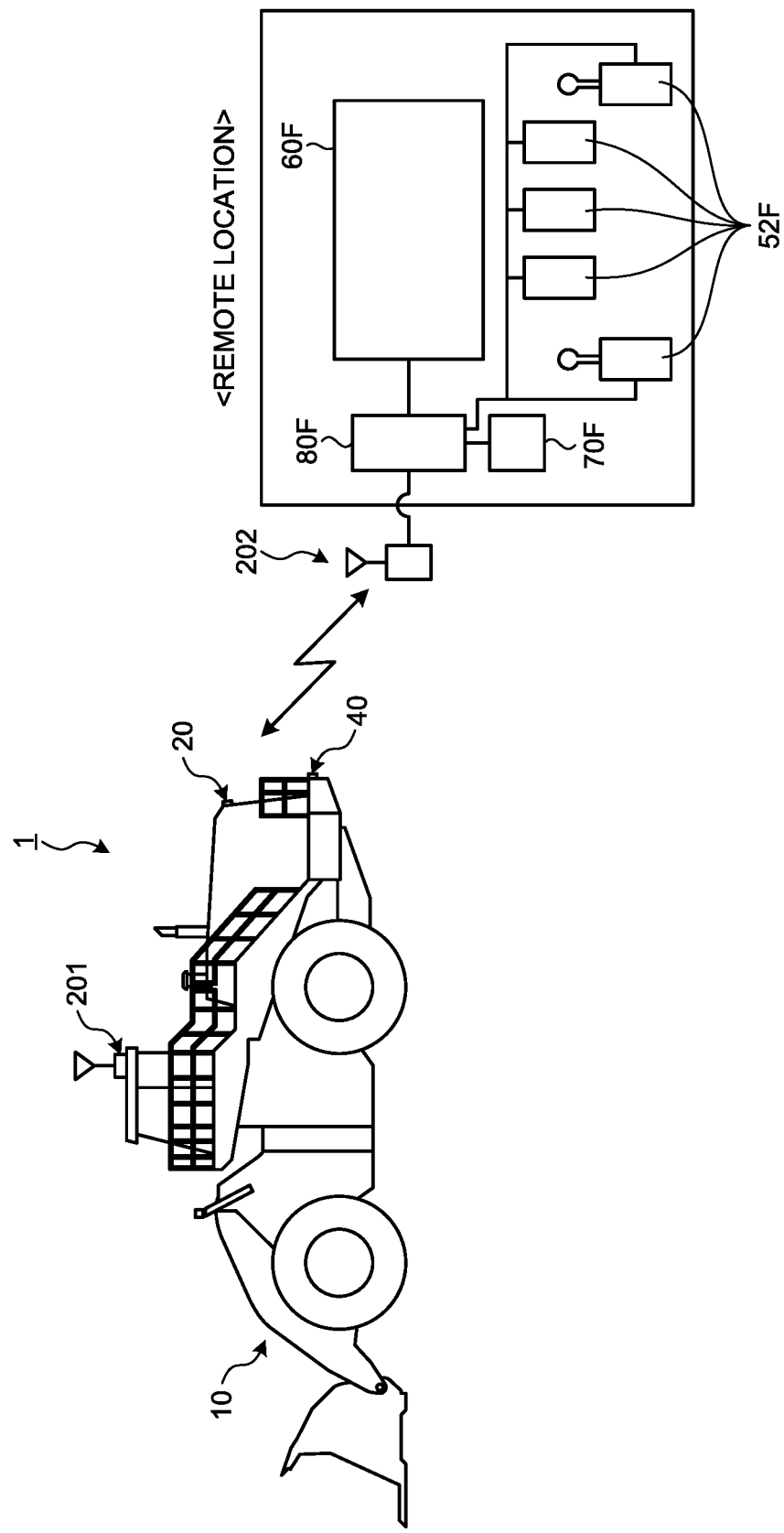
FIG. 18 is a view schematically illustrating an example of a work vehicle according to a second embodiment.

FIG. 18 is a view schematically illustrating an example of a wheel loader 1 according to the present embodiment. In the present embodiment, the wheel loader 1 is remotely controlled by a driving operation device 52F provided in the remote location from the wheel loader 1.

Similarly to the embodiment described above, the wheel loader 1 at least includes a vehicle body 2, a working implement 10, and a camera 20. To the vehicle body 2, front tires 6F are mounted. The working implement 10 is movably coupled to the vehicle body 2 and at least a part thereof is arranged anterior to the front tires 6F. The camera 20 is arranged at a front portion of the vehicle body 2 and shoots an image of a shooting area including at least a part of the front tires 6F.

A display device 60F, an input device 70F, a control device 80F, and the driving operation device 52F are arranged in a remote control facility provided in the remote location from the wheel loader 1. Each of the display device 60F, the input device 70F, the control device 80F, and the driving operation device 52F is provided separately from the wheel loader 1.

The wheel loader 1 and the control device 80F wirelessly communicate with each other via a wireless communication system. The wheel loader 1 is provided with a wireless communication instrument 201 of the wireless communication system, and a wireless communication instrument 202 of the wireless communication system is connected to the control device 80F.

The driving operation device 52F includes, for example, an accelerator pedal, a brake pedal, a shift lever, a steering lever for swinging and steering the wheel loader 1, a forward/backward switch for performing switching between forward traveling and backward traveling of the wheel loader 1, and an operation lever for operating the working implement 10. An operator operates the driving operation device 52F in the remote control facility. An operation signal generated by the driving operation device 52F being operated is transmitted to the wheel loader 1 via the wireless communication system. Consequently, the wheel loader 1 is remotely controlled, and adjustment of a travel speed, switching between forward traveling and backward traveling, and swing of the wheel loader 1, and an operation of the working implement 10 are performed.

The control device 80F includes a shot image data acquisition unit 82, an obstacle data acquisition unit 83, a bird's eye image composition unit 84, a front image generation unit 85, a camera image switching unit 86, a storage unit 87, an obstacle position data generation unit 90, and a display control unit 91, which are similar to those described with reference to FIG. 11.

A shot image shot by the camera 20 provided in the wheel loader 1 is transmitted to the control device 80F from the wheel loader 1 via the wireless communication system. The display control unit 91 of the control device 80F causes the display device 60F to display the shot image shot by the camera 20 and transmitted from the wheel loader 1 via the wireless communication system, and a first guide image Ld which indicates a first projection position PL1 obtained by projecting a first site SL1 of the working implement 10 on a plane FL including ground-contacting surfaces of the front tires 6F in a superimposed manner. The operator in the remote control facility can visually observe the display data displayed on the display device 60F.

As described above, the wheel loader 1 may be remotely controlled via the wireless communication system. The operator operates the driving operation device 52F in the remote location. The operation signal of the driving operation device 52F is transmitted to the wheel loader 1 via the wireless communication system. The wheel loader 1 can perform adjustment of a traveling speed, switching between forward traveling and backward traveling, and an operation of the working implement 10 based on the operation signal of the driving operation device 52F. When the control device 80F is provided in the remote location, obstacle data acquired by a non-contact sensor 40 and shot image data acquired by the camera 20 are transmitted to the control device 80F in the remote location via the wireless communication system. The control device 80F can cause the display device 60F provided in the remote location to display a bird's eye image BI based on the received shot image data. In addition, the control device 80F can cause the display device 60F provided in the remote location to display a mark 63 indicating an obstacle based on the received obstacle data.

In each of the embodiments described above, it has been assumed that the first guide image and the second guide image respectively include guide lines. At least one of the first guide image and the second guide image may not necessarily be a line. For example, the first guide image and the second guide image may include at least one of a circle mark, an elliptical mark, a polygonal mark, and a star mark. The first guide image and the second guide image may include a transparentized image. For example, the first guide image and the second guide image may include a transparentized hatching through which ground surface RS can be seen.

In each of the embodiments described above, the first projection position PL1 is a projection position of the distal end 12E (first site SL1) of the bucket 12 in a dumping reach attitude. However, the first site SL1 corresponding to the first projection position PL1 may be a different location. The first site SL1 corresponding to the first projection position PL1 may be, for example, a projection position of the distal end 12E of the bucket 12 when the boom 11 is arranged at the upper end of the range of movement of the boom 11, and the bucket 12 is arranged at the upper end of the range of movement of the bucket 12. Alternatively, the first site corresponding to the first projection position PL1 may not necessarily be the projection position of the distal end 12E of the bucket 12, but be a projection position of a proximal end of the bucket 12 or a projection position of a distal end of the boom 11.

In each of the embodiments described above, the second projection position PL2 is a projection position of the front ends (second sites SL2) of the front tires 6F. However, the second sites SL2 corresponding to the second projection position PL2 may be different projection positions, and for example, may be projection positions of a part of the front wheels 5F to which the front tires 6F are mounted. The second sites SL2 corresponding to the second projection position PL2 may be a projection position of the front end of the vehicle body front portion 2F.

In each of the embodiments described above, it has been assumed that the bucket 12, which is a kind of working member and includes a plurality of blades, is coupled to the distal end of the boom 11. The working member coupled to the distal end of the boom 11 may be a blade with a straight blade edge.

In each of the embodiments described above, it has been assumed that the wheel loader 1 operates in a mining site. The wheel loader 1 may be used in a working site or a construction site, or may be used for snow removal operations, for operations in the agricultural and livestock industries, or for operations in the forestry industry. The working member coupled to the distal end of the boom 11 may be a snow plow or a snow bucket used for snow removal operations, a bale grab or a fork used for operations in the agricultural and livestock industries, or a fork or a bucket used for operations in the forestry industry.

REFERENCE SIGNS LIST

1 WHEEL LOADER (WORK VEHICLE)
2 VEHICLE BODY
2F VEHICLE BODY FRONT PORTION
2R VEHICLE BODY REAR PORTION
3 OPERATION PLATFORM
4 TRAVELING DEVICE
5 WHEEL
5F FRONT WHEEL
5R REAR WHEEL
6 TIRE
6F FRONT TIRE
6R REAR TIRE
7 POWER TRANSMISSION MECHANISM
8 HOUSING
8B AXLE BALL
9 JOINT MECHANISM
10 WORKING IMPLEMENT
11 BOOM
12 BUCKET
12B DISTAL END
12E END
13 BOOM CYLINDER
14 BUCKET CYLINDER
15 BELL CRANK
16 LINK
20 CAMERA
20A, 20B, 20C, 20D, 20E, 20F CAMERA
30 ILLUMINATION DEVICE
31 CASING
31L ROD MEMBER
32 COVER MEMBER
33 PILLAR
40 NON-CONTACT SENSOR (RADAR DEVICE)
40A, 40B, 40C, 40D NON-CONTACT SENSOR (RADAR DEVICE)
50 ANGLE SENSOR
52 DRIVING OPERATION DEVICE
52A ACCELERATOR PEDAL
52B BRAKE PEDAL
54 OPERATION PANEL
56 MONITOR DEVICE
58 REAR-VIEW MONITOR DEVICE
60 DISPLAY DEVICE
61 FIRST AREA
62 SECOND AREA
63 MARK
64 INDICATOR
65 ICON
70 INPUT DEVICE
80 CONTROL DEVICE
82 SHOT IMAGE DATA ACQUISITION UNIT
83 OBSTACLE DATA ACQUISITION UNIT
84 BIRD'S EYE IMAGE COMPOSITION UNIT
85 FRONT IMAGE GENERATION UNIT
86 CAMERA IMAGE SWITCHING UNIT
87 STORAGE UNIT
90 OBSTACLE POSITION DATA GENERATION UNIT
91 DISPLAY CONTROL UNIT
100 SURROUNDINGS MONITORING SYSTEM
201 WIRELESS COMMUNICATION INSTRUMENT
201 WIRELESS COMMUNICATION INSTRUMENT
La, Lb, Lc LINE
Ld FIRST GUIDE IMAGE
Le SECOND GUIDE IMAGE
LG LINE
RS GROUND SURFACE

The invention claimed is:

1. A work vehicle comprising:
a vehicle body to which front tires are mounted;
a working implement movably coupled to the vehicle body and at least a part of which is arranged anterior to the front tires;
a camera that is arranged at a front portion of the vehicle body and shoots an image of an anterior area outside the vehicle body as a shooting area; and
a display control unit that causes a display device to display an image shot by the camera and a first guide that is superimposed on the image at a first projection position according to a position of the working implement, the first projection position being obtained by projecting a first site of the working implement on a plane in the image including ground-contacting surfaces of the front tires.

2. The work vehicle according to claim 1, wherein
the working implement includes a boom coupled to the vehicle body and a bucket coupled to the boom, and
the first site includes a distal end of the bucket.

3. The work vehicle according to claim 2, wherein
the first site includes the distal end of the bucket when the boom after a raising operation is arranged at an upper end of a range of movement of the boom, and the bucket after a dump operation is arranged at a lower end of a range of movement of the bucket.

4. The work vehicle according to claim 1, wherein
the display control unit causes the display device to display a second guide image that indicates a second projection position obtained by projecting second sites of the front tires on the plane in a superimposed manner.

5. The work vehicle according to claim 4, wherein the second sites include front ends of the front tires.

6. The work vehicle according to claim 4, wherein the second guide image includes an image that indicates a projection position obtained by projecting side portions of the front tires on the plane.

7. The work vehicle according to claim 1, wherein the working implement comprises at least a bucket, and the first projection position is obtained by projecting a distal end of the bucket on a plane in the image including ground-contacting surfaces of the tires.

8. The work vehicle according to claim 1, wherein the working implement comprises at least a bucket, and the first projection position is obtained by projecting a distal end of the bucket in a dumping reach attitude on a plane in the image including ground-contacting surfaces of the tires.

9. A work vehicle comprising:
a vehicle body to which front tires are mounted;
a working implement that includes a boom coupled to the vehicle body and a bucket coupled to the boom;
a camera that is arranged at a front portion of the vehicle body and shoots an image of a shooting area including at least a part of the front tires; and
a display control unit that causes a display device to display (1) an image shot by the camera, (2) a first guide that is superimposed on the image at a first projection position according to a position of the working implement, the first projection position being obtained by projecting a distal end of the bucket on a plane in the image including ground-contacting surfaces of the tires, and (3) a second guide that is superimposed on the image at a second projection position obtained by projecting front ends of the front tires on the plane.

10. The work vehicle according to claim 9, wherein the first guide image includes a first guide line in parallel with a rotation axis of the front tires, and the second guide image includes a second guide line in parallel with the rotation axis of the front tires.

11. A display device that is provided separately from a work vehicle comprising: a vehicle body to which front tires are mounted, a working implement movably coupled to the vehicle body and at least a part of which is arranged anterior to the front tires; a camera that is arranged at a front portion of the vehicle body and shoots an image of an anterior area outside the vehicle body as a shooting area; and a wireless communication system, and is caused to display an image shot by the camera and transmitted from the work vehicle via the wireless communication system and a first guide that is superimposed on the image at a first projection position according to a position of the working implement, the first projection position being obtained by projecting a first site of the working implement on a plane in the image including ground-contacting surfaces of the front tires.

* * * * *